United States Patent
Ueno et al.

(10) Patent No.: US 7,825,653 B2
(45) Date of Patent: Nov. 2, 2010

(54) ROTATION DETECTION DEVICE AND BEARING HAVING ROTATION DETECTION DEVICE

(75) Inventors: Shintarou Ueno, Iwata (JP); Toru Takahashi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/585,897

(22) Filed: Sep. 28, 2009

(65) Prior Publication Data

US 2010/0019761 A1      Jan. 28, 2010

Related U.S. Application Data

(63) Continuation of application No. PCT/JP2008/000628, filed on Mar. 18, 2008.

(30) Foreign Application Priority Data

Mar. 29, 2007   (JP)   ............... 2007-087695
Aug. 24, 2007   (JP)   ............... 2007-218014

(51) Int. Cl.
G01P 3/48   (2006.01)

(52) U.S. Cl. .................................. 324/174

(58) Field of Classification Search ............. None
See application file for complete search history.

(56) References Cited

U.S. PATENT DOCUMENTS

| | | | |
|---|---|---|---|
| 4,050,747 A |   | 9/1977 | Ruhnau et al. |
| 5,644,288 A | * | 7/1997 | Kuroyanagi ............... 340/441 |
| 6,294,910 B1 |   | 9/2001 | Travostino et al. |
| 6,700,367 B1 |   | 3/2004 | Santos et al. |
| 2010/0019761 A1 | * | 1/2010 | Ueno et al. ............ 324/207.25 |

FOREIGN PATENT DOCUMENTS

| | | |
|---|---|---|
| JP | 52-127372 | 10/1977 |
| JP | 8-128855 | 5/1996 |
| JP | 2001-518608 | 10/2001 |
| JP | 2002-541485 | 12/2002 |
| WO | 99/17081 | 4/1999 |
| WO | 00/62079 | 10/2000 |

OTHER PUBLICATIONS

English Translation of the International Preliminary Report on Patentability mailed Oct. 29, 2009 in corresponding International Patent Application PCT/JP2008/000628.
International Search Report for PCT/JP2008/000628, mailed Jun. 17, 2008.

* cited by examiner

*Primary Examiner*—Jay M Patidar

(57) ABSTRACT

To provide a rotation detecting system of a type having a high detecting resolution, in which the rotational position can be detected accurately, in which a sufficient gap can be secured between the sensor and the rotating body and which is effective to simplify assemblage and processing to thereby reduce the manufacturing cost, the rotation detecting system is provided with a multiplying section 4 for multiplying the pulses, generated by the sensor 3, by a multiplication factor to form multiplied pulses Pb and a speed detecting section 5 for detecting an period average speed of the encoder 71 during the interval, in which the latest N pieces of the multiplied pulses Pb have been generated where N represents the multiplication factors by which the multiplied pulses Pb have been multiplied.

7 Claims, 23 Drawing Sheets

GAP CHARACTERISTICS:
44 MAGNETIC POLE PAIRS AXIAL ENCODER
(MAGNETIC FIELD INTENSITY:30mT,gap=1.0mm)

GAP CHARACTERISTICS:
34 MAGNETIC POLE PAIRS RADIAL ENCODER
(MAGNETIC FIELD INTENSITY:20mT,gap=1.0mm)

ROTATION DETECTION DEVICE AND BEARING HAVING ROTATION DETECTION DEVICE

CROSS REFERENCE TO THE RELATED APPLICATION

This application is a continuation application, under 35 U.S.C. §111(a), of international application No. PCT/JP2008/000628, filed Mar. 18, 2008, which claims priority to Japanese patent application No. 2007-087695, filed Mar. 29, 2007 and Japanese patent application No. 2007-218014, filed Aug. 24, 2007, the disclosures of which are incorporated by reference in their entirety into this application.

BACKGROUND OF THE INVENTION

1. Field of the Invention

The present invention relates to a rotation detecting system for use in detecting the rotation and/or the rotational speed exhibited by various machines and also to a bearing assembly equipped with such rotation detecting system.

2. Description of the Related Art

The rotation detecting system of this kind is well known, in which a ring shaped encoder having a plurality of circumferentially arranged magnetic pole pairs (N and S), which serve as, for example, to-be-detected poles, is coaxially mounted on a rotating body so that passage of the magnetic poles of the magnetic encoder can be detected by a magnetic sensor. In the rotation detecting system of this kind, the magnetic sensor generates pulses corresponding to the number of the magnetic pole pairs during one complete rotation of the magnetic encoder.

Also, disclosure has been made on the rotation detecting system, in which the pulses outputted from the magnetic sensor in response to the magnetic pole pairs of the magnetic encoder are multiplied by a multiplying circuit so that the output of pulses, the number of which is greater than the actual number of the magnetic pole pairs, can be obtained for the purpose of increasing the resolution of the detection. (See, for example, the Patent Documents 1 and 2 listed below.)

[Patent Document 1] Japanese Laid-open Patent Publication No. 2001-518608

[Patent Document 2] Japanese Laid-open Patent Publication No. 2002-541485

FIG. 29 illustrates an example of the system for generating the pulses that are multiplied in the manner described above. In this case, two magnetic sensors 40A and 40B arranged at respective positions displaced 90° in phase from each other with one magnetic pole pair taken as one cycle are disposed in face-to-face relation with the magnetic poles of the magnetic encoder, so that output pulses A and B, which are displaced 90° in phase relative to each other can be obtained from those magnetic sensors 40A and 40B. When those output pulses A and B are combined, the multiplied pulses C having a fourfold resolution can be obtained.

However, in such case, if the difference in phase between those output pulses A and B shifts from 90°, an error will occur in pulse width among the multiplied pulses C.

Another system for generating the multiplied pulses is also suggested, in which based on two analog output signals A and B generated from the magnetic sensors 40A and 40B, multiplication may be accomplished by determining the phase o as shown in FIG. 30.

However, even in this case, if the phase o shifts from 90° or the amplitude of each of the analog output signals A and B changes, an error will occur.

In the case of the construction disclosed in the previously mentioned patent publications, a pitch error tends to occur in the multiplied pulses generated, depending on the distribution of magnetic fields of the magnetic encoder and/or circuit characteristics of the multiplying circuit. FIG. 31 illustrates one example of the pitch error in a graph. In such case, there is shown an example in which within the interval between the magnetic poles of one pair, N pieces of multiplied pulses are generated, in which numerals 1, 2, 3 . . . and N in the axis of abscissas represent the number of the multiplied pulses.

As shown therein, if the pitch error occurs between the multiplied pulses so generated, there is a problem in that variation of the rotational speed detected by the use of the multiplied pulses tends to become large even though the resolution of rotation detection increases.

SUMMARY OF THE INVENTION

In view of the foregoing, the present invention has for its object to provide a rotation detecting system of a type having a high detecting resolution, in which variation in rotational speed to be detected can be minimized to allow detection of the rotational position to be accomplished accurately, in which a sufficient gap can be secured between the sensor and the rotating body and which is effective to simplify assemblage and processing to thereby reduce the manufacturing cost. Another important object of the present invention is to provide the rotation detecting system incorporated bearing assembly, in which the above described rotation detecting system is incorporated.

In order to accomplish the foregoing object of the present invention, there is provided a rotation detecting system which includes an encoder provided rotatably and having a plurality of to-be-detected elements arranged equidistantly in a direction circumferentially thereof; a sensor for detecting the to-be-detected elements of the encoder to generate pulses; a multiplying section for multiplying the pulses, generated by the sensor, by a multiplication factor, which is represented by N, to form multiplied pulses; and a speed detecting section for updatingly detecting a period average speed of the encoder during the interval in the past, in which the latest N pieces of the multiplied pulses have been generated.

Although the multiplied pulses generated by the multiplying section have a pitch error, the pattern of such error has a characteristic repeatability that the pitch error is repeated each time the to-be-detected magnetic pole of the encoder is detected. Accordingly, when the use is made of the speed detecting section to detect the speed, which will become an average speed for the N pieces of the multiplied pulses, at the interval of the pulse before it is multiplied, variations resulting from the pitch error can be averaged and any error in detection speed can be minimized. In this way, since the multiplied pulses are generated from the multiplying section and, with respect to the speed, the speed is outputted at the interval of pulses before the latter are multiplied, it is possible to provide a speed output with good precision, in which the pitch error has been averaged with multiplied high resolution. Also, since the detection speed is detected with the use of all of the multiplied pulses, the detecting rate of the speed increases. In other words, the number of sampling times for detecting the speed can be increased. In this way, the response to control can be increased and even a slight change in speed can be detected with high precision.

In one embodiment of the present invention, the encoder may be a magnetic encoder having magnetic poles, which serves as the to-be-detected elements, arranged in the direction circumferentially thereof, and the sensor may be a magnetic sensor for detecting the magnetic poles of the magnetic encoder. Alternatively, the encoder referred to above may be a gear-shaped pulsar ring having serrations, which serve as the to-be-detected magnetic poles, arranged on a circumference thereof, or of a type capable of detecting optically.

The magnetic encoder has a difficulty in increasing the resolution as compared with an optical encoder, but it has a merit in that it is well adapted to the environment such as, for example, muddy water and/or dusts. For this reason, when the magnetic encoder is used, advantages in that the detecting resolution is high and in that the variation in rotational speed detected is less considerable can be effectively demonstrated and, therefore, the rotation detecting system highly resistant to the environment and having the high resolution can be obtained.

In one embodiment of the present invention, the encoder may be employed in the form of a ferrite magnet and has a magnetized magnetic pole width within the range of 1 to 3 mm. In such case, the practical gap of the sensor can be set to a value within the range of 0.5 to 1.5 mm.

In another embodiment of the present invention, the speed detecting section may include a pulse generating time storage having a storage area for storing the time of generation of each of the latest N pieces of the multiplied pulses, a timer operable to measure the times of generation of the multiplied pulses, each time the multiplied pulse is generated, and to update the storage contents of the pulse generating time storage to be represented by time of generation of the latest N pieces of the multiplied pulses, and a speed calculating circuit for calculating the difference between the time of generation of the latest multiplied pulse and the time of generation of the past multiplied pulses equal to the number of the multiplication factors stored in the pulse generating time storage and for calculating an average rotational speed, using this calculated difference.

By so constructing, the speed detecting section which detects the speed with the use of all of the multiplied pulses can be realized with a simplified construction.

In a further embodiment of the present invention, the rotation detecting system may also include a rotational pulse output section for outputting the multiplied pulses, generated by the multiplying section, as rotational pulses and a speed signal output section for outputting the speed, detected by the speed detecting section, as a speed signal.

According to this structural feature, by outputting both of the rotational pulses and the speed signals, the processing circuit employed in any machine utilizing the rotation detecting system can be dispensed with or simplified and downsized.

In the rotation detecting system of the construction according to the present invention, the sensor, the multiplying section and the speed detecting section may be either integrated on a common sensor chip or integrated together using a common substrate. In this case, since the rotation pulses and the speed signals can be outputted from the single sensor chip or substrate, the rotation detecting system can be manufactured compact in size and the signal processing circuit can be dispensed with.

Also, in the rotation detecting system of the construction according to one embodiment of the present invention, the sensor and the multiplying section may include a plurality of arranged magnetic detecting elements, in which case an output of a predetermined multiplication factors is generated based on an internal signal generated by calculating respective outputs from the magnetic detecting elements.

According to another aspect of the present invention, the present invention also provides a rotation detecting system equipped bearing assembly having mounted thereon the rotation detecting system of any one of the constructions described hereinabove.

According to this another aspect of the present invention, not only can the rotation pulse of a high resolution be outputted, but also speed detection with high precision is possible and the number of component parts of the machine utilizing the bearing assembly and the number of processing steps can be reduced, allowing it to be manufactured compact in size.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
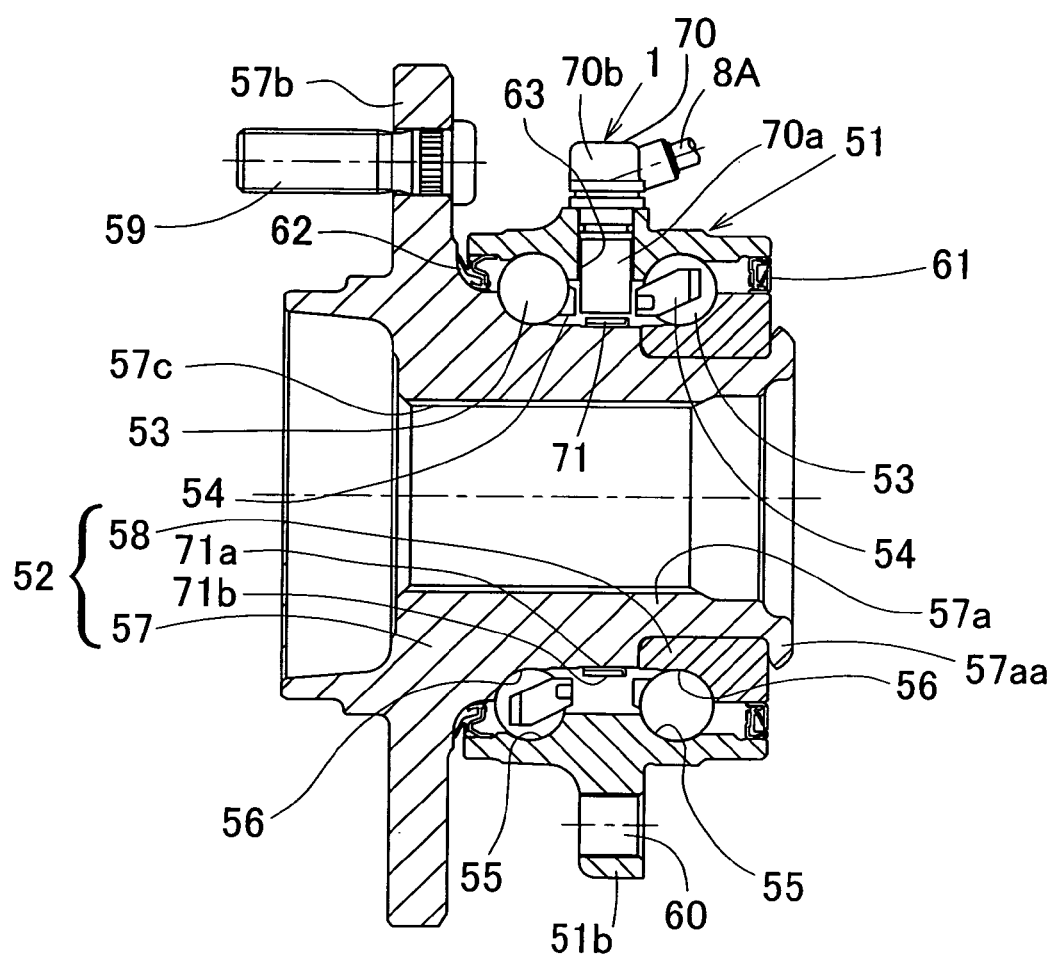
FIG. 1 is a longitudinal sectional view showing a wheel support bearing assembly according to a first embodiment of the present invention.
Figure 2:
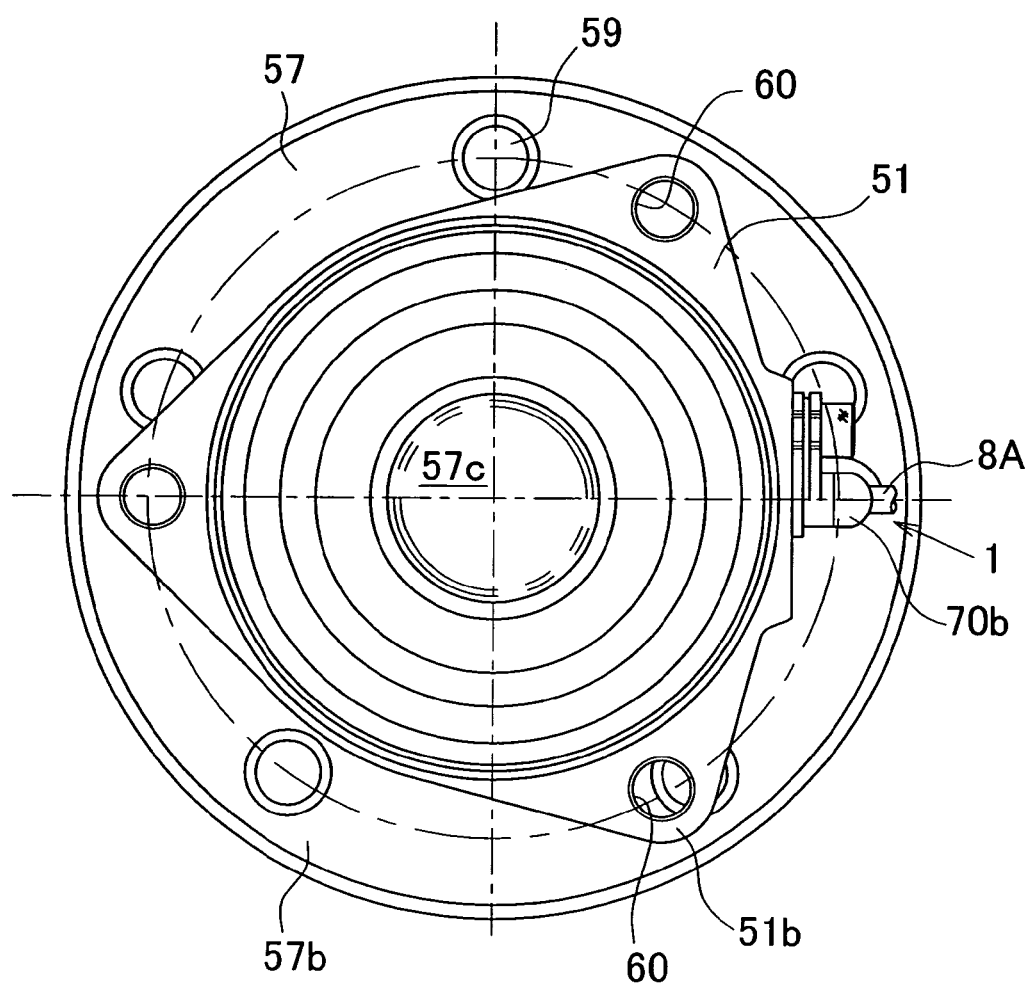
FIG. 2 is a side view showing the wheel support bearing assembly shown in FIG. 1 as viewed from an inboard side.

A first embodiment of the present invention will be described in detail with particular reference to FIGS. 1 to 12. The first embodiment is directed to a wheel support bearing assembly that is used in practice as fitted to an automotive vehicle such as, for example, a car.

It is to be noted that hereinbefore and herein after in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel support bearing assembly according to the illustrated embodiment includes a generally tubular outer member 51, a generally tubular inner member 52 positioned substantially inside the outer member 51 with an annular bearing space delimited between it and the outer member 51, and double rows of rolling elements 53 accommodated within the annular bearing space and rollingly interposed between the outer and inner members 51 and 52. This wheel support bearing assembly is used to support a vehicle wheel rotatably relative to the vehicle body and also includes a rotation detecting system 1, as will be described later, made up of a sensor unit 70 and a magnetic encoder 71 which is an element to be detected by the sensor unit 70. The rotation detecting system 1 referred to above has an external configuration which may be chosen for each example to fit to the manner of fitting thereof.

The outer member 51 is a member on a stationary side, i.e., a stationary member and the inner member 52 is a member on a rotating side, i.e., a rotating member. The rolling elements 53 of each row are retained by a retainer 54 employed one for each row thereof and are interposed between a corresponding raceway 55, defined in an inner periphery of the outer member 51, and a corresponding raceway 56 defined in an outer periphery of the inner member 52. The illustrated wheel support bearing assembly is rendered to be a double row angular contact ball bearing type and, hence, the raceways 55, 55 and 56, 56 for the respective rows of the rolling elements 53 are so formed as to have their contact angles held in back-to-back relation with each other.

The wheel support bearing assembly best shown in FIG. 1 is a so-called third generation type and is shown as applied to support a vehicle drive wheel. The inner member 52 is made up of a wheel hub 57 having a hub axle 57a integral therewith and an inner race 58 mounted externally on an inboard side of the hub axle 57a, with the raceways 56 for the associated rows defined respectively on an outer periphery of the hub axle 57a of the wheel hub 57 and an outer periphery of the inner race 58. The hub axle 57a of the wheel hub 57 has a longitudinal center bore 57c defined therein for the insertion thereinto of a stem portion of a constant velocity joint best shown in FIGS. 23 and 24. The inner race 58 is fixedly mounted on a radially inwardly stepped portion formed in the hub axle 57a of the wheel hub 57 and is fixed to the wheel hub 57 for rotation together therewith by a crimped portion 57aa formed in an inboard end of the hub axle 57a.

The wheel hub 57 has a wheel mounting flange 57b formed in a portion adjacent an outboard end portion thereof so as to extend radially outwardly therefrom and the vehicle wheel and a brake rotor, both now shown, are rigidly connected to the wheel mounting flange 57b in overlapped relation with each other by means of a plurality of hub bolts 59. Each of the hub bolts 59 is press-fitted into a corresponding bolt fitting hole defined in the wheel mounting flange 57b.

The outer member 51 is of one-piece construction including a vehicle body fitting flange 51b formed on an outer periphery thereof so as to extend radially outwardly. This outer member 51 is rigidly secured to a knuckle (not shown) of an automotive suspension system by means of a plurality of knuckle bolts passed into respective bolt holes 60 defined in the vehicle body fitting flange 51b.

It is to be noted that opposite annular ends of the bearing space delimited between the outer and inner members 51 and 52 as described above are sealed by respective sealing devices 61 and 62 each including a constant seal.

The magnetic encoder 71 includes a ring-shaped multipolar magnet having a plurality of magnetic poles N and S alternating with each other in a direction circumferentially thereof and is mounted on an outer peripheral surface of the inner member 52 while having been positioned intermediate between the rows of the rolling elements 53 and 53. The magnetic encoder 71, which is the to-be-detected element, may be in the form of a core member 71a having a multipolar magnet 71b such as, for example, a rubber magnet or a plastic magnet mounted on an outer periphery thereof, or in the form of a sintered magnet or the like.

The sensor unit 70 is fixedly inserted into a sensor mounting hole 63 defined in the outer member 51 at a location substantially intermediate between the rows of the rolling elements 53 and 53 so as to extend radially, and a sensor tip thereof confronts the magnetic encoder 71 in a radial direction with a magnetic gap intervening therebetween. The sensor mounting hole 63 referred to above is, for example, a throughhole of a round cross-section. Any gap existing between an inner peripheral surface of the sensor mounting hole 63 and the sensor unit 70 is sealed off by a contact seal such as, for example, an O-ring, or a bonding material or the like.

The sensor unit 70 has a shaft-like insert 70a of an outer diameter sufficient to allow it to be snugly inserted into the sensor mounting hole 63, and a head 70b, which is not inserted into the sensor mounting hole 63 and opposite to the shaft-like insert 70a, with the head 70b positioned in contact with an outer peripheral surface of the outer member 51. An electric cable 8A is lead out from the head 70b of the sensor unit 70 for electric connection with an external electric circuit. The insert 70a and the head 70b, both referred to above are made of, for example, an elastic member.

The rotation detecting system 1 includes, as described above the ring-shaped encoder 71 having a plurality of to-be-detected magnetic poles arranged equidistantly in a direction circumferentially thereof and the sensor unit 70. The sensor unit 70 had a sensor 3 for detecting the to-be-detected magnetic poles of the encoder 71 to generate pulses Pa, a multiplying section 4 for multiplying the pulses Pa, generated by the sensor 3, by a predetermined multiplication factor N to provide multiplied pulses Pb, and a speed detecting section 5 for detecting the rotational speed of the encoder 71 on the basis of the multiplied pulses Pb generated from the multiplying section 4.

Figure 4A:
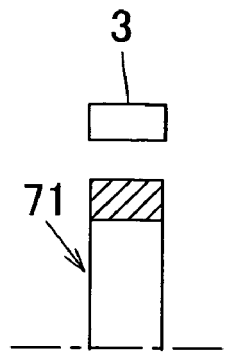
FIG. 4A is a fragmentary longitudinal sectional view of an encoder employed in the rotation detecting system, showing only one of halves of the encoder that are divided along a longitudinal axis thereof.
Figure 4B:
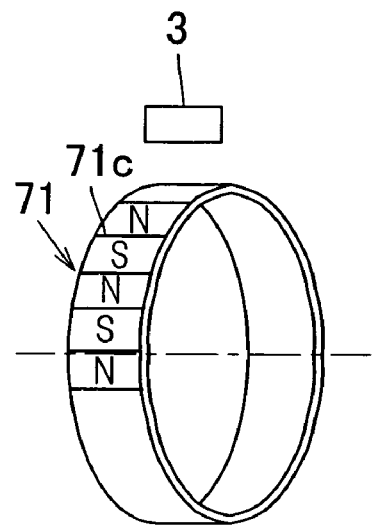
FIG. 4B is a schematic perspective view of the encoder.

As shown in, for example, FIGS. 4A and 4B showing a fragmentary sectional view and a perspective view, respectively, the encoder 71 is in the form of a ring-shaped magnetic encoder having, as to-be-detected magnetic poles, a plurality of magnetic pole pairs (each pair including magnetic poles N and S) arranged an equal distance in a direction circumferentially thereof and is rotatably supported when it is fixed coaxially to a rotating body (not shown) which is an element to be detected. In the illustrated embodiment, the sensor 3 is in the form of a magnetic sensor capable of detecting the magnetic poles N and S of the magnetic encoder 71 and arranged away from the magnetic encoder 71 in a direction, for example, radially outwardly thereof so as to confront a peripheral surface thereof, for example, on an outer diametric side.

Figure 5A:
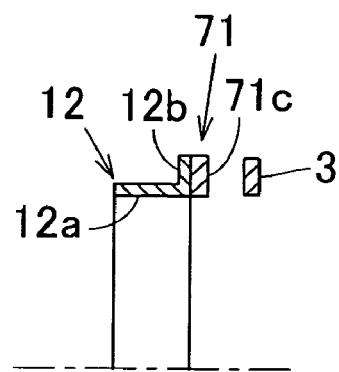
FIG. 5A is a fragmentary longitudinal sectional view of a modified form of the encoder employed in the rotation detecting system, showing only one of halves of the encoder that are divided along a longitudinal axis thereof.
Figure 5B:
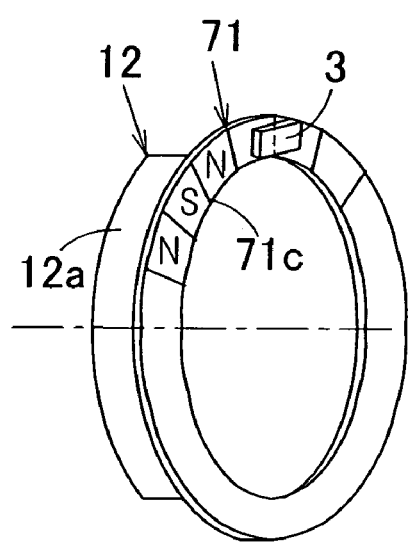
FIG. 5B is a schematic perspective view of the modified form of the encoder.

Although the structure of the magnetic encoder 71 shown in particular reference to FIGS. 4A and 4B is a radial type in which the magnetic pole pairs 71c are magnetized in the peripheral surface thereof, the magnetic encoder 71, which can be employed in the practice of the present invention, may be an axial type as shown in FIGS. 5A and 5B in a fragmentary sectional view and a perspective view, respectively. In the structure shown in FIGS. 5A and 5B, using a ring-shaped backing metal 12 of, for example, an L-shaped cross-section having a cylindrical portion 12a and an annular flange 12b extending radially outwardly from one end of the cylindrical portion 12a, the plural magnetic pole pairs 71c are magnetized equidistantly to one annular surface of the flange 12b, which is opposite to the cylindrical portion 12a, in a direction circumferentially thereof. The magnetic encoder of the structure shown in FIGS. 5A and 5B can be fixedly mounted on a rotating body such as, for example, a rotary shaft with the cylindrical portion 12a of the backing metal 12 mounted on an outer periphery of the rotating body. In such case, the magnetic sensor 3 used therewith has to be positioned so as to axially confront the magnetized surface of the flange 12b of the magnetic encoder 71.

It is to be noted that the sensor 3 and the multiplying section 4 may be made up of a plurality of arranged magnetic detecting elements (not shown) so that an output multiplied by a predetermined multiplication factor can be generated based on an internal signal generated by calculating respective outputs of those plural magnetic detecting elements.

Figure 6:
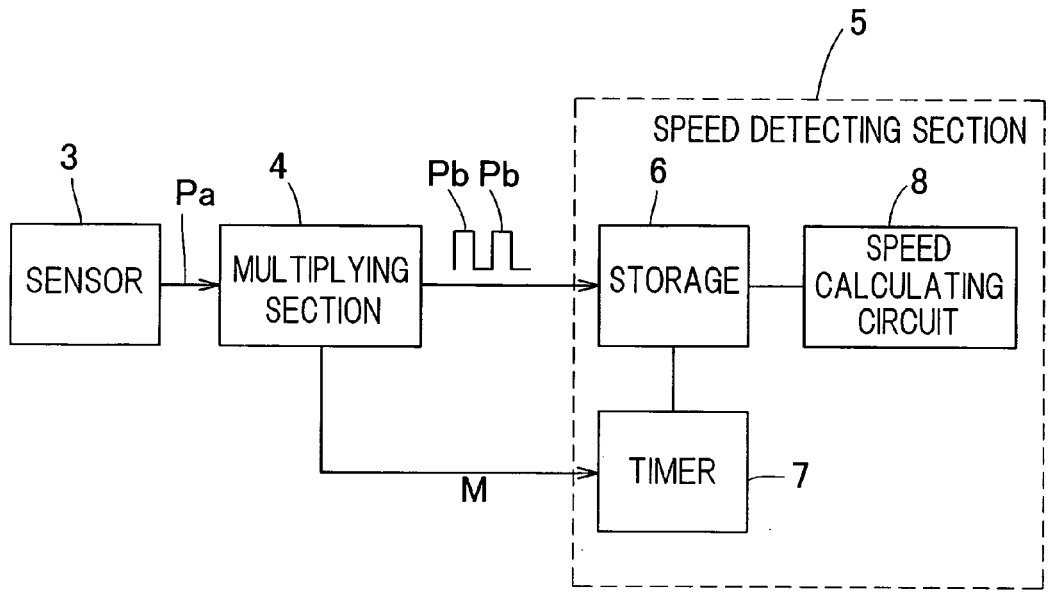
FIG. 6 is a circuit block diagram showing a speed detecting section employed in the rotation detecting system.

The speed detecting section 5 referred to previously is operable, each time the multiplying section 4 generates a multiplied pulse Pb, to updatingly detect a period average rotational speed of the encoder 71 during the interval in the past in which the latest N pieces of the multiplied pulses Pb have been generated where the number N represents the multiplication factor by which the multiplied pulses generated in the past have been multiplied. In such case, the speed detecting section 5 makes use of a multiplying information M, outputted from the multiplying section 4, to detect the rotational speed referred to above. The multiplying information M referred to above is information concerning operating condition of the multiplying section 4, which the speed detecting section requires in performing the calculation and includes such as, for example, the multiplication factor set therein. The speed detecting section 5 is specifically made up of a pulse generating time storage 6, a timer 7 and a speed calculating circuit 8 as shown in FIG. 6.

Figure 7:
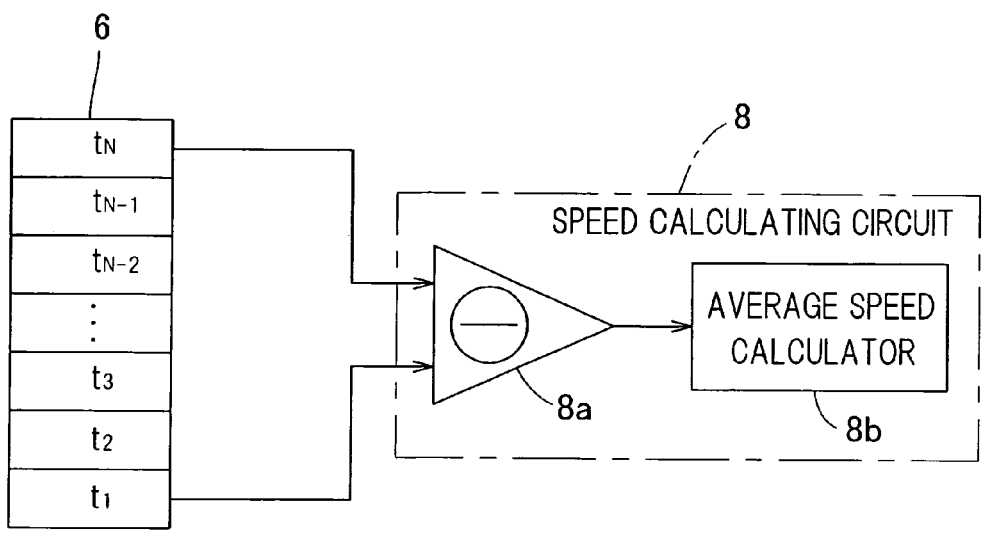
FIG. 7 is a circuit block diagram showing a pulse generating time storage and a speed calculating circuit both employed in the speed detecting section.

The pulse generating time storage 6 has a storage area for storing the time of generation of the latest N pieces of the multiplied pulses Pb where the number N represents the multiplication factors. An example of the structure of the storage area of the pulse generating time storage 6 is shown in FIG. 7. As shown in FIG. 7, the timings $t_1, t_2, \ldots t_{N-1}$ and $t_N$ represent respective times at which the number N of the successive multiplied pulses Pb are generated. The pulse generating time storage 6 is a storage means such as, for example, queue for storing the times for the latest N pieces of the multiplied pulses in a first-in first-out manner and is operable in such a manner that stored contents can be successively moved to neighboring storage areas in an array of the storage areas so that while the oldest stored contents are erased, the updated time data can be inputted to the leading storage area then emptied.

The timer 7 is operable to measure the times of generation (specifically, the times at which the pulses Pb rise) of the multiplied pulses Pb each time the multiplied pulse Pb is generated, and to cause the time data to be stored in the pulse generating time storage 6. In this process, as hereinabove described, the storage contents of the pulse generating time storage are updated to the recent multiplied pulses equal to the number N of the multiplication factors.

It is to be noted that the term "timer 7" referred to above and hereinafter is intended to encompass a clock and input processing circuit including a clock portion having a function of a timer itself and an input processing portion for inputting the times measured by the clock portion to the pulse generating time storage 6.

The speed calculating circuit 8 includes a difference calculator 8a and an average speed calculator 8b as shown in FIG. 7 and is so designed that simultaneously with the storage of the time of generation of the updated multiplied pulse in the pulse generating time storage 6, the difference calculator 8a may calculate the difference between the time of generation of the updated multiplied pulse Pb and the time of generation of the N-th latest multiplied pulse Pb stored in the pulse generating time storage 6, where N refers to the multiplication factors and, subsequently, the average speed calculator 8b may calculate the average rotational speed referred to previously, using this calculated difference.

Figure 8:
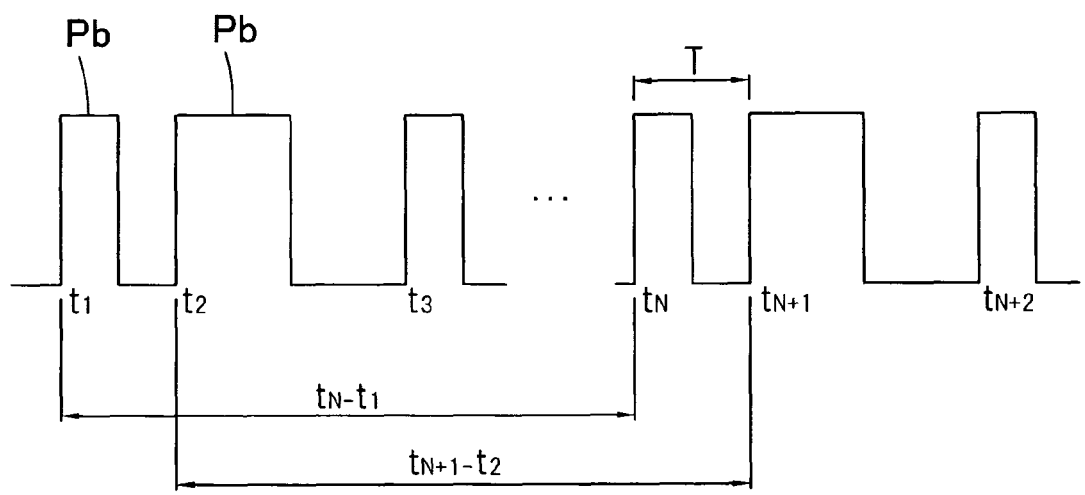
FIG. 8 is a chart used to explain the operation of a differential calculating unit employed in the speed calculating circuit.

By way of example, referring to FIG. 8 showing waveforms of the multiplied pulses Pb generated consecutively, simultaneously with the storage of the time of generation $t_N$ of the recent multiplied pulse Pb in the pulse generating time storage 6, the difference calculator 8a in the speed calculating circuit 8 calculates the difference $(t_N-t_1)$ between the time of generation $t_N$ and the time of generation $t_1$ of the N-th latest multiplied pulse Pb. Then the average speed calculator 8b makes use of the calculated difference to determine the average rotational speed (angular speed) v expressed by the following formula:

$$v=\Delta\theta/(t_N-t_1)$$

wherein $\Delta\theta$ represents the orbiting velocity of one magnetic pole pair 71c of the magnetic encoder 71. In other words, assuming that the number of the magnetic pole pairs 71c (shown in FIGS. 4 and 5) of the magnetic encoder 71 is expressed by m, the value $\Delta\theta$ is equal to 360°/m.

Similarly, when the time of generation $t_{N+1}$ of the subsequent multiplied pulse Pb is stored in the pulse generating time storage 6, the difference $(t_{N+1}-t_2)$ between the time of generation $t_{N+1}$ and the time of generation $t_2$ of the updated Nth latest multiplied pulse is calculated by the difference calculator 8a and the average rotational speed v is then calculated by the average speed calculator 8b as expressed by the following formula:

$$v=\Delta\theta/(t_{N+1}-t_2)$$

Each of the multiplied pulse Pb generated by the multiplying section 4 contains such a pitch error as shown in FIG. 8. The pattern of such pitch errors has such a characteristic repeatability that the pitch error is repeated for each magnetic pole pair 71c of the magnetic encoder 71. Accordingly, as described hereinbefore, where the orbiting angle $\Delta\theta$ of the magnetic pole pair 71c is divided by the interval (for example, $t_N-t_1$) corresponding to the N pieces of the multiplied pulses Pb, which are generated by multiplying the pulses Pa generated from the sensor 3, to detect the rotational angle v, variations of the pitch errors can be averaged and, accordingly, an error of the detected speed can be minimized as shown by A in FIG. 9. In addition, since the speed detection is accomplished in synchronism with generation of each multiplied pulse Pb, the detecting resolution can be increased.

Figure 9:
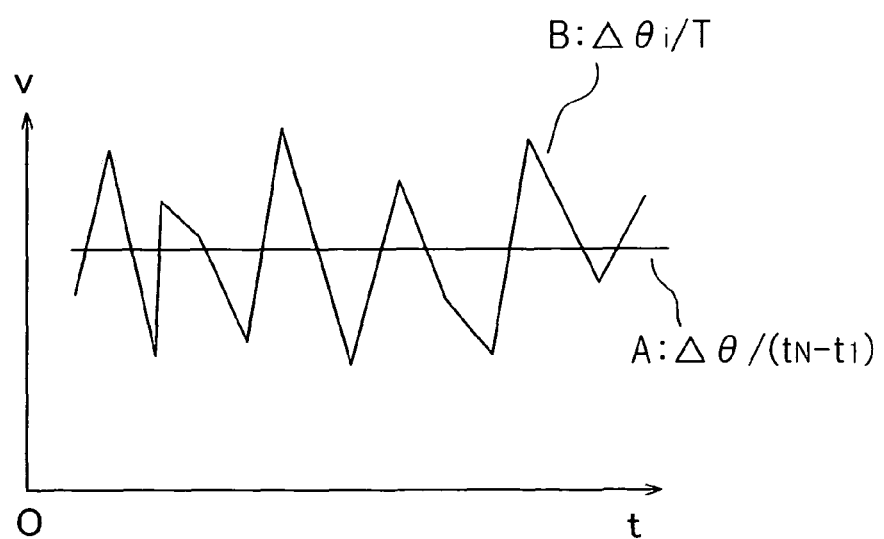
FIG. 9 is a chart showing change in speed calculated by the speed calculating circuit, which is shown in comparison with change in speed calculated according to the conventional method.

In contrast thereto, where the velocity v is calculated as v=$\Delta\theta i/T$ using the rotational angle $\Delta\theta i$ corresponding to the pulse pitch of the individual multiplied pulses Pb shown in FIG. 8 and the time interval T of the previously described pulse pitches such as observed in the conventional system, variation in error of the detection speed is considerable as shown by B in FIG. 9.

Figure 3:
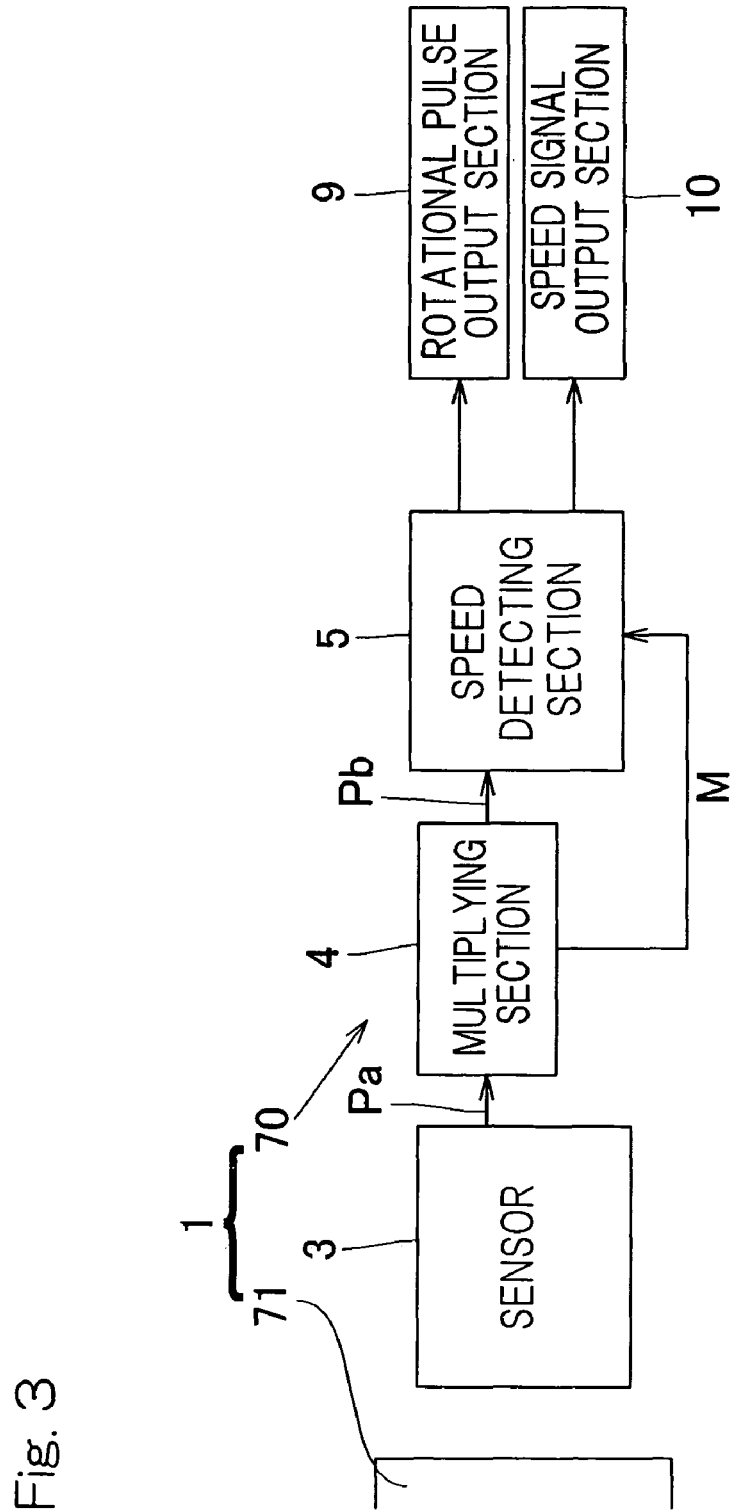
FIG. 3 is a circuit block diagram showing a schematic structure of a rotation detecting system employed in the wheel support bearing assembly shown in FIG. 1.

Also, the rotation detecting system according to the embodiment now under discussion also includes, as best shown in FIG. 3, a rotational pulse output section 9 for outputting the multiplied pulse, generated by the multiplying section 4, in the form of a rotational pulse, and a speed signal output section 10 for outputting the average rotational speed, detected by the speed detecting section 5, in the form of a speed signal. The speed signal outputted from the speed signal output section 10 is outputted in synchronism with outputting of the rotational pulse from the rotational pulse output section 9. When both of the rotational pulse and the speed signal are outputted in this way, a processing circuit used in a machine which utilizes this rotation detecting system can be dispensed with or simplified to allow it to be downsized.

In the construction shown in FIG. 3, the sensor 3, the multiplying section 4 and the speed detecting section 5 may be integrated together on a common sensor chip or on a common substrate. Where they are integrated on the sensor chip or substrate, the rotation pulses and the speed signals can be outputted from the common sensor chip or substrate and, therefore, the rotation detecting system 1 can be manufactured compact in size and the signal processing circuit can be dispensed with.

Figure 10:
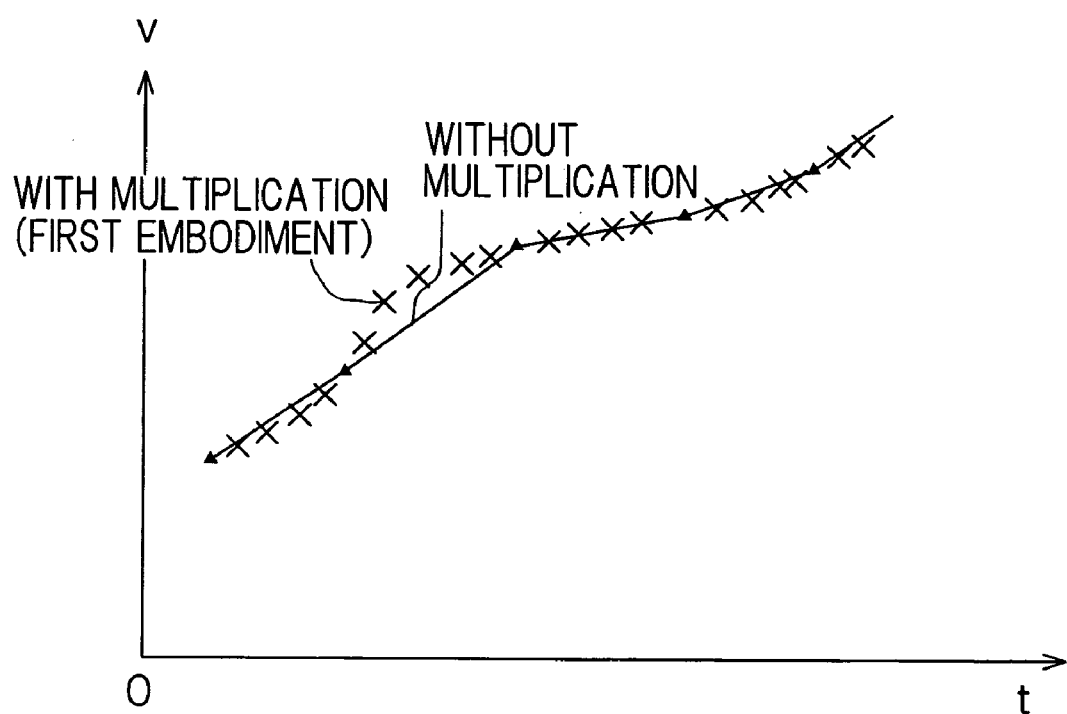
FIG. 10 is a chart showing plots descriptive of detected speeds, obtained by the use of multiplied pulses, which is shown in comparison with plots descriptive of detected speeds obtained with no use of the multiplied pulses.

As hereinbefore described, in the rotation detecting system 1 according to the first embodiment, the speed detection is carried out by utilizing all of the multiplied pulses Pb, which are the pulses Pa generated from the sensor 3 and multiplied. Accordingly, the rate of speed detection, that is, the number of sampling times in speed detection can be increased as shown by x in FIG. 10, to thereby enhance the response to control in the rotation control utilizing the detected speed v. Also, even slight change in speed can be detected with high precision. It is to be noted that blackened triangles employed in FIG. 10 represent the case in which no multiplied pulse Pb is used, that is, a change in speed v detected as a result of the speed detection which has been carried out by the utilization of only the pulses Pa generated from the sensor 3.

Figure 11:
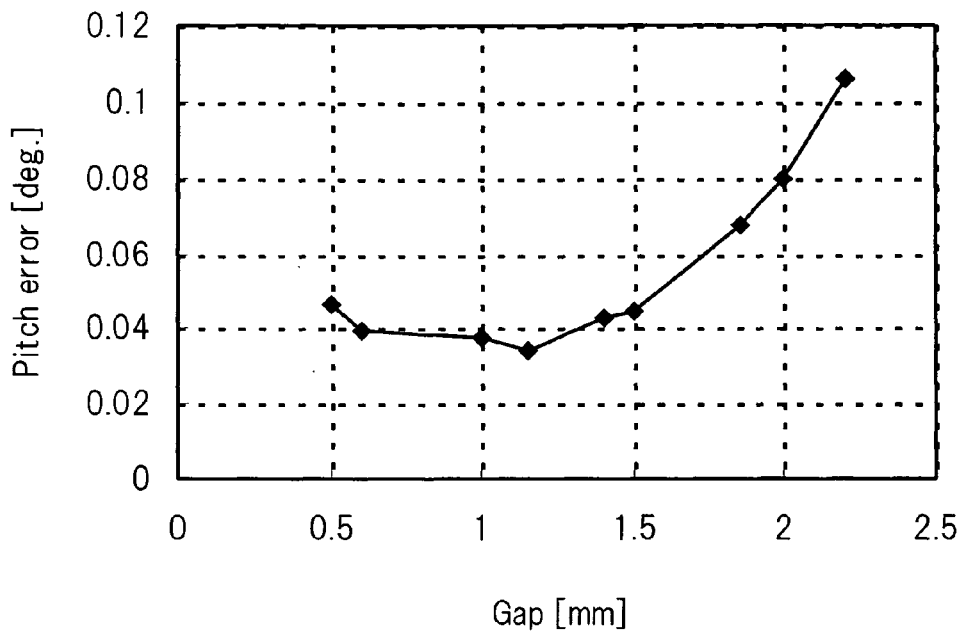
FIG. 11 is a chart showing change in detection signal pitch error resulting from change in gap between a sensor and an encoder magnet.
Figure 12:
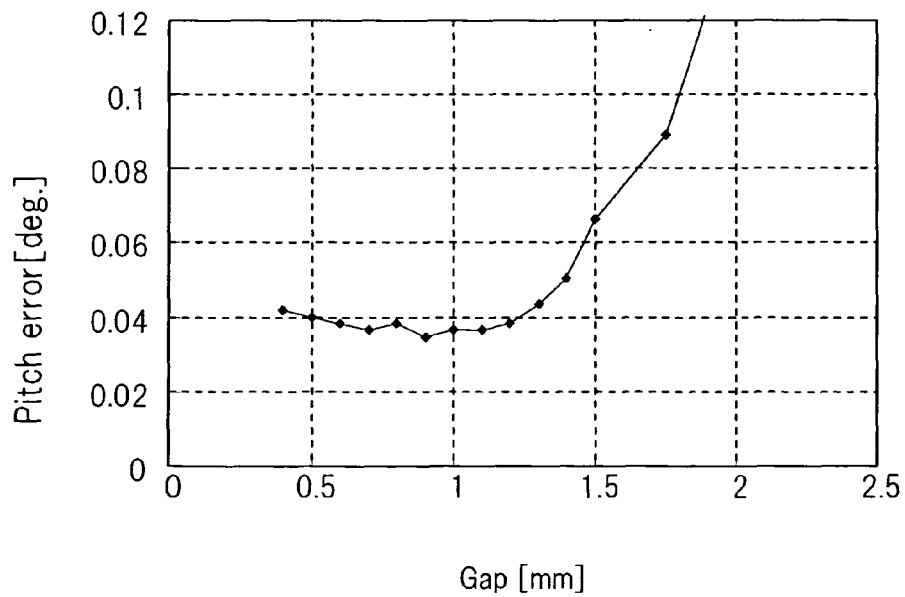
FIG. 12 is a chart showing change in detection signal pitch error resulting from change in gap between a sensor and another type of encoder magnet.

FIGS. 11 and 12 illustrate charts showing a change in pitch error of the detection signal resulting from a change in gap between the sensor and the encoder magnet. In particular, FIG. 11 is illustrative of the case in which the axial type magnet having 44 magnetic pole pairs is employed whereas FIG. 12 is illustrative of the case in which the radial type magnet having 34 magnetic pole pairs is employed. In both cases, the magnetic poles are magnetized to have a magnetic pole width of 2.4 mm.

The magnetic field intensity exhibited by the encoder magnet is set to about 20 mT or more for the gap size of 1 mm and, in order to secure this magnetic field intensity, it is necessary for the magnetic pole width to be 1 mm or greater. The signal precision when combined with this magnet, that is, the pitch error shown in the axis of ordinates of the chart does not increase so much so long as the gap size is equal to or smaller than about 1.5 mm. In order to accomplish the stabilized detection, the gap size has to be set to a value equal to or smaller than 1.5 mm and, on the other hand, it is necessary to use the encoder magnet which has been magnetized with sufficient intensity. Also, in order to avoid a mechanical contact, it is not recommended to set the gap size to a value smaller than 0.5 mm.

In the foregoing embodiment, the encoder 71 is used in the form of a ferrite magnet and the magnetized magnetic pole width of this encoder 71 is set to a value within the range of 1 to 3 mm. In such case, the sensor 3 can have a practical gap of a size within the range of 0.5 to 1.5 mm. Accordingly, not only can the mechanical contact be avoided, but also the stabilized detection can be accomplished with a desired magnetic field density secured.

According to the wheel support bearing assembly equipped with the rotation detecting system of the kind described hereinbefore, the multiplied pulses Pb generated by the multiplying section 4 have a pitch error, but the pattern of such pitch error has a characteristic repeatability in which the pitch error is repeated each time the to-be-detected magnetic pole of the encoder 71 is detected. In view of this, the use is made of the speed detecting section 5 to detect the speed for the interval of the pulse before it is multiplied, which corresponds to an period average speed during the interval corresponding to N pieces of the multiplied pulses. In this way, variations resulting from the pitch error can be averaged and any error in detection speed can be minimized.

Since as hereinbefore described, the multiplied pulses Pb are generated by the multiplying section 4 and, as far as the speed is concerned, the speed is outputted at the interval of the pulse before it is multiplied, it is possible to output, with high precision, a speed of which pitch errors have been averaged. Also, since the detected speed is detected with the use of all of the multiplied pulses, the rate of detection of the speed becomes high. In other words, the number of sampling times for the detection of the speed can be increased. Accordingly, the response to control can be increased and even the slight change in speed can be detected with high precision.

Since the number of rotational pulses, which is several to tens times the number of the conventional rotational pulses, can be obtained even though any existing encoder 71 is employed, even slight rotation can be detected. Also, since the rotation detecting unit can have a reduced diameter simultaneously with enhancement of the high resolution, it is possible to contribute to reduction in size and weight of the wheel support bearing assembly as a whole.

Since where this wheel support bearing assembly is applied to the automotive vehicle, difference in rotation between left and right vehicle wheels and any change in rotational speed can be detected with high sensitivity, it is possible to accomplish a highly sophisticated vehicle control with the use of this signal and also to increase the safety factor and the maneuverability of the automotive vehicle. By way of example, the accuracy of measuring the rotational speeds of the left and right vehicle wheels can be increased and early prediction of the amount of tire skidding which would occur during the cornering can be facilitated, thus leading to an increase of the precision of the anti-skid system and the vehicle posture stabilizing system (both not shown). Also, where the automotive vehicle is started on a hill, the conventional art is such that the brake system is activated even if the automotive vehicle moves, for example, a maximum distance of 20 mm backwards, but even a backward movement of the automotive vehicle over, for example a distance of 1 mm can be detected and the brake system can therefore be activated. In view of this, there is no need to arrange the sensor 3 in the vicinity of the encoder 71 in order to increase the resolution and, hence, assemblage and processing of the rotation detecting system 1 can be simplified to reduce the manufacturing cost.

The speed detecting section 5 includes the pulse generating time storage 6 having the storage area for storing the times of generation of the multiplied pulses Pb of the latest N pieces of the multiplied pulses, the timer 7 operable to measure the times of generation of the multiplied pulses Pb, each time the multiplied pulse Pb is generated, and to cause the time data to be stored in the pulse generating time storage 6 so that the storage contents of the pulse generating time storage 6 can be updated to those of the latest N pieces of multiplied pulses, the speed calculating circuit 8 including the difference calculator 8a for calculating the difference between the time of generation of the updated multiplied pulse Pb and the time of generation of the N-th latest multiplied pulses Pb the stored in the pulse generating time storage 6, and the average speed calculator 8b which, using this calculated difference, calculates the average rotational speed.

In this case, the speed detecting section 5, which detects with the use of all of the multiplied pulses Pb can be realized with a simplified construction. Accordingly, it is possible to reduce the cost of manufacturing of the wheel support bearing assembly equipped with the rotation detecting system.

The wheel support bearing assembly of this embodiment may include the rotational pulse output section 9 for outputting the multiplied pulses Pb, generated by the multiplying section 4, as the rotational pulses and the speed signal output section 10 for generating the speed, detected by the speed detecting section 5, as the speed signal. When both of the rotational pulse and the speed signal are outputted in this way, the processing circuit used in the machine which utilizes this rotation detecting system can be dispensed with or simplified to allow it to be downsized. Accordingly, the versatility of the wheel support bearing assembly equipped with the rotation detecting system can be enhanced.

The sensor 3 and the multiplying section 4 may be made up of a plurality of arranged magnetic detecting elements so that an output multiplied by a predetermined multiplication factor can be generated based on an internal signal generated by calculating respective outputs of those plural magnetic detecting elements.

The wheel support bearing assembly according to a second embodiment of the present invention will now be described in detail.

In the description that follows, component parts referred to in the following description, but similar to those described in connection with the foregoing embodiment are designated by like reference numerals and, therefore, the details thereof may not be reiterated for the sake of brevity. Also, where only a part of the construction is described in the following description, the remaining part or parts of the construction are to be understood as similar to those described in connection with the foregoing embodiment and that, unless inconveniences may arise in not only a combination of parts which are described in details in the foregoing embodiment, but also a combination in particular, parts of one embodiment can be combined with part of another embodiment.

Figure 13:
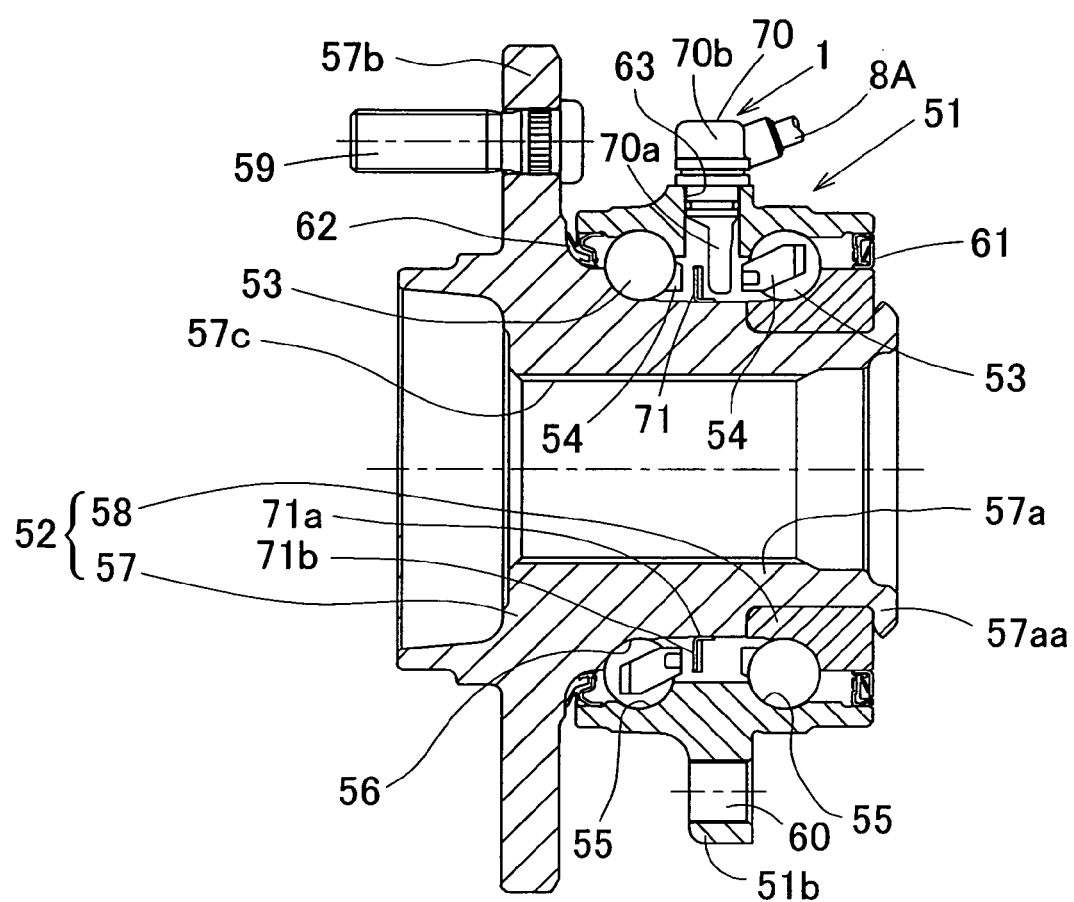
FIG. 13 is a longitudinal sectional view showing the wheel support bearing assembly according to a second embodiment of the present invention.
Figure 14:
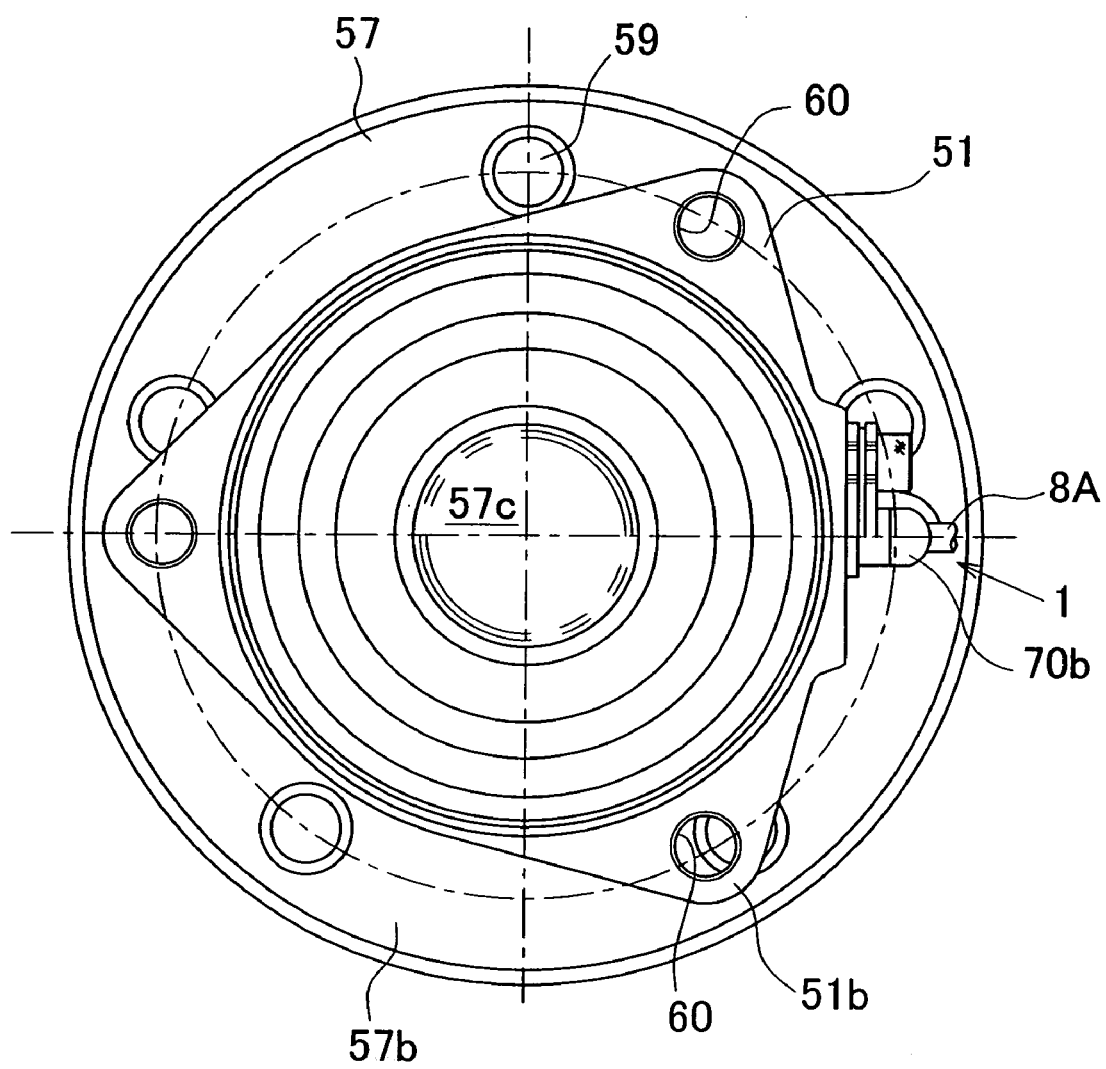
FIG. 14 is a side view showing the wheel support bearing assembly shown in FIG. 13 as viewed from the inboard side.

The second embodiment specifically shown in FIGS. 13 and 14 is substantially similar to the first embodiment of the present invention shown in and described with particular reference to FIG. 1, except that the rotation detecting system 1 includes the sensor unit 70 and the magnetic encoder 71, both employed in the practice of the second embodiment, which are so arranged as to confront with each other in an axial direction. The magnetic encoder 71 is of a type including a multipolar magnet 71b secured to a radial upright wall of a generally L-sectioned core member 71a. The sensor unit 70 is so constructed that an internal sensor 3 at the tip thereof can confront the multipolar magnet 71 in a direction axially thereof. Other structural features and effects brought about thereby are substantially similar to those of the first embodiment shown in and described with particular reference to FIG. 1.

Figure 15:
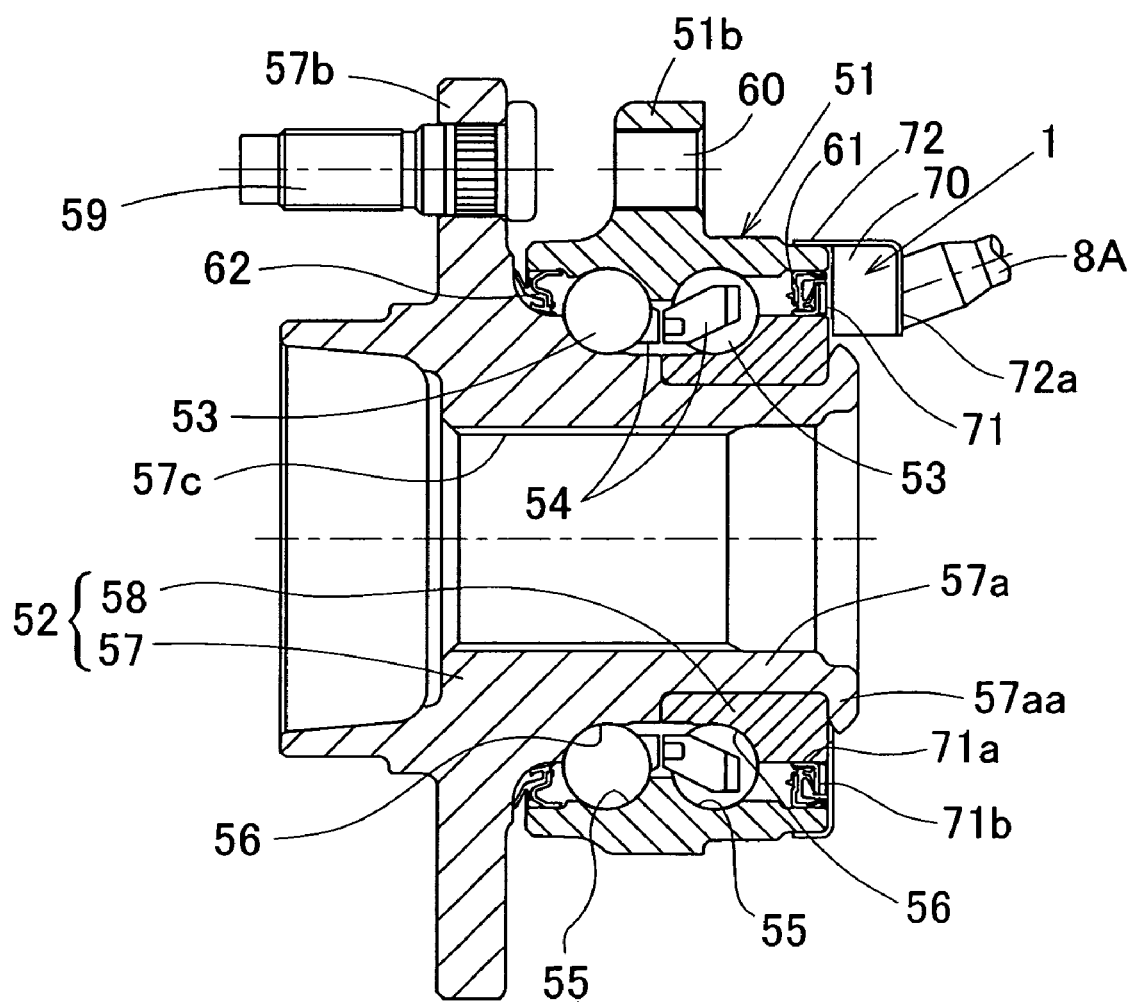
FIG. 15 is a longitudinal sectional view showing the wheel support bearing assembly according to a third embodiment of the present invention.
Figure 16:
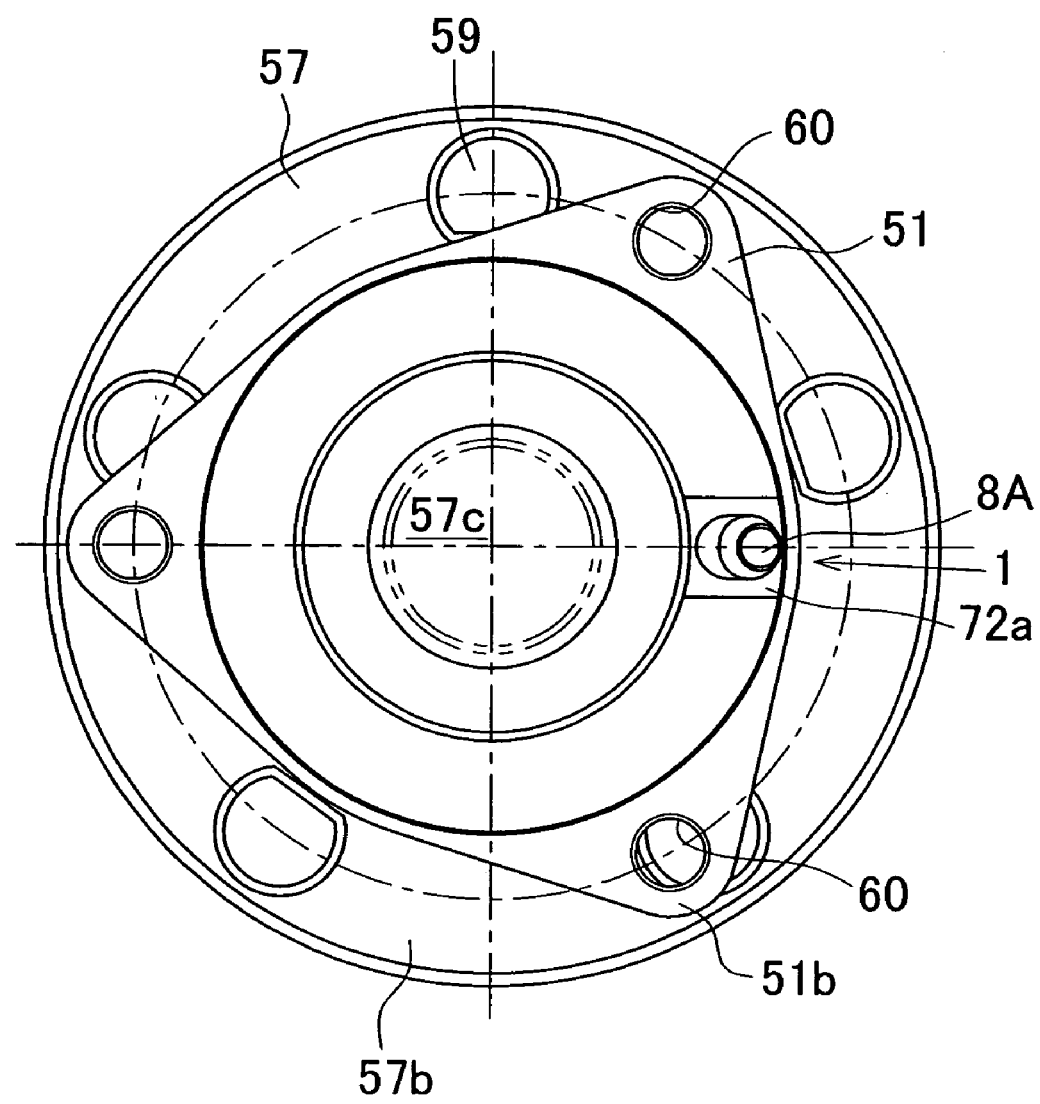
FIG. 16 is a side view showing the wheel support bearing assembly shown in FIG. 15 as viewed from the inboard side.

A third embodiment shown in FIGS. 15 and 16 is substantially similar to the first embodiment of the present invention shown in and described with particular reference to FIG. 1, except that the sensor unit 70 of the rotation detecting system 1 employed in the third embodiment is secured to an inboard end of the outer member 51 through a sensor mounting member 72. The sensor mounting member 72 is in the form of a substantially ring-shaped metallic plate mounted on an outer periphery of the outer member 51 so as to be held in abutment with an annular end face and has a portion thereof in a circumferential direction thereof formed with a sensor mounting tongue 72a for securing the rotation detecting system 1 to the outer member 51. The magnetic encoder 71 is of a type including a multipolar magnet 71b secured to a radial upright wall of a generally L-sectioned core member 71a and is mounted on an outer periphery of the inner race 58. This magnetic encoder 71 concurrently forms a portion of the inboard sealing device 61. The magnetic encoder 71 and the sensor unit 70 are so arranged as to confront with each other in the axial direction.

According to the third embodiment shown in and described with reference to FIGS. 15 and 16, since no sensor mounting hole such as the sensor mounting hole 63 employed in the practice of the first embodiment shown in FIG. 1 is employed, ingress of an external water through the sensor mounting hole can be avoided. Other structural features and effects brought about thereby are substantially similar to those of the first embodiment shown in and described with particular reference to FIG. 1.

Figure 17:
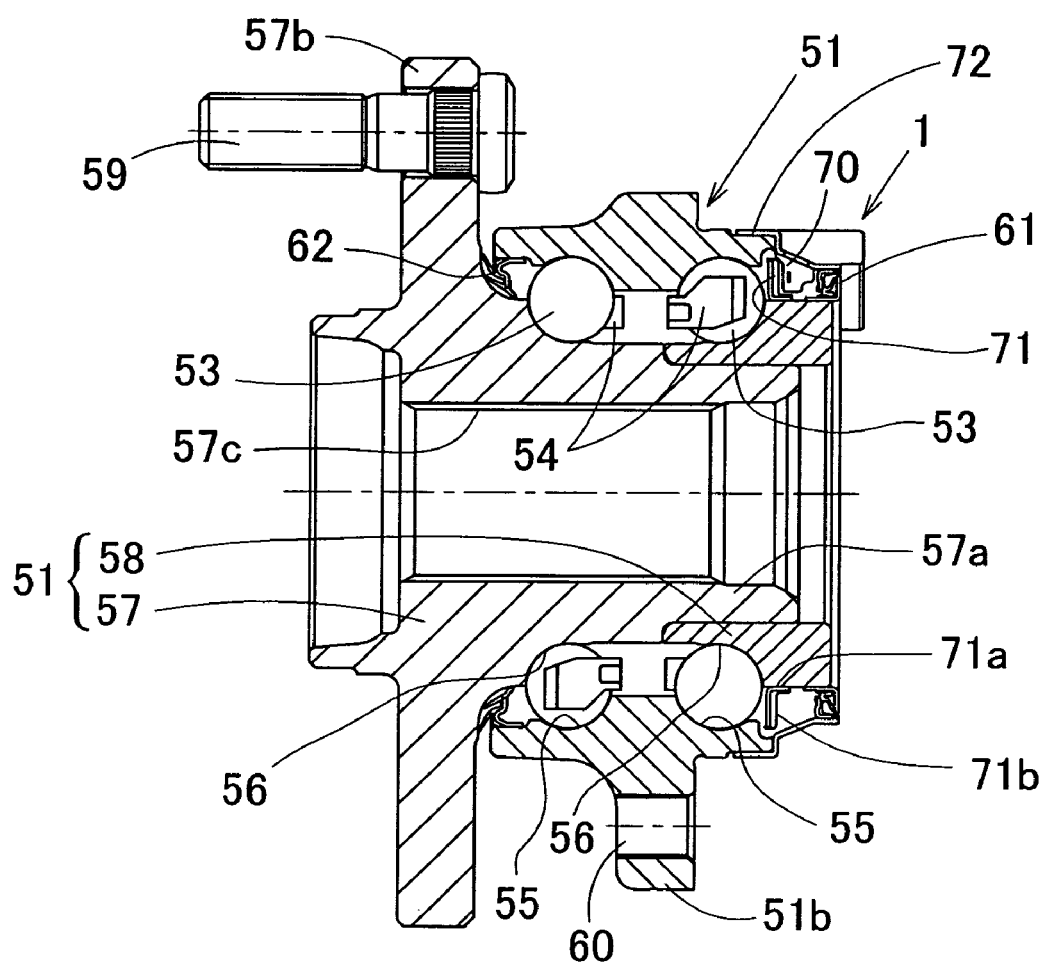
FIG. 17 is a longitudinal sectional view showing the wheel support bearing assembly according to a fourth embodiment of the present invention.
Figure 18:
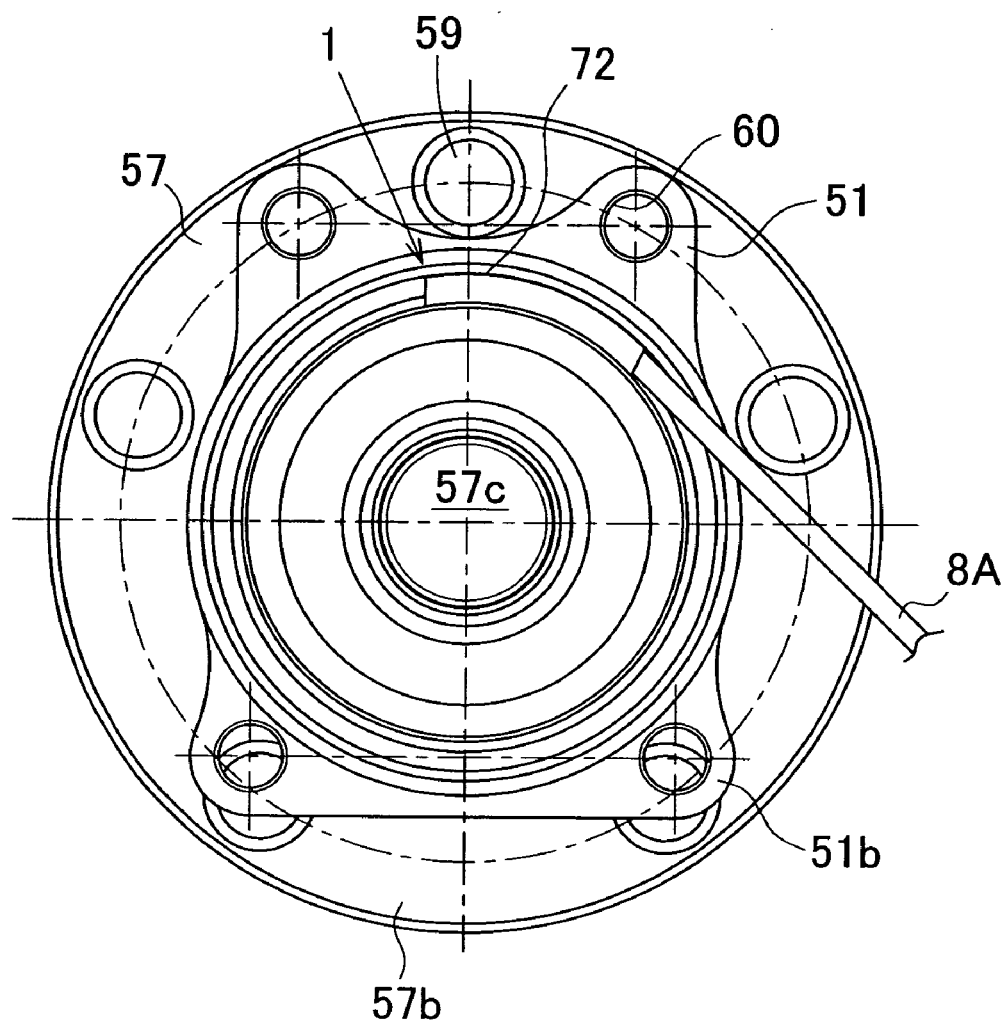
FIG. 18 is a side view showing the wheel support bearing assembly as shown in FIG. 17 viewed from the inboard side.

A fourth embodiment shown in FIGS. 17 and 18 is substantially similar to the third embodiment of the present invention shown in and described with particular reference to FIGS. 15 and 16, except that the sealing device 61 used to seal the inboard annular end of the bearing space in the fourth embodiment is positioned on an outer side of the magnetic encoder 71. In other words, the sealing device 61 comprised of a contact seal or the like is positioned intermediate between an annular sensor mounting member 72, fitted to the outer member 51, and the inner race 58.

According to the fourth embodiment, the magnetic encoder 71 can be sealed from an external space by the sealing device 61 and, therefore, an undesirable biting of foreign matter in between the magnetic encoder 71 and the sensor unit 70 can be prevented advantageously. Other structural features and effects brought about thereby are substantially similar to those of the third embodiment shown in and described with particular reference to FIGS. 15 and 16.

Figure 19:
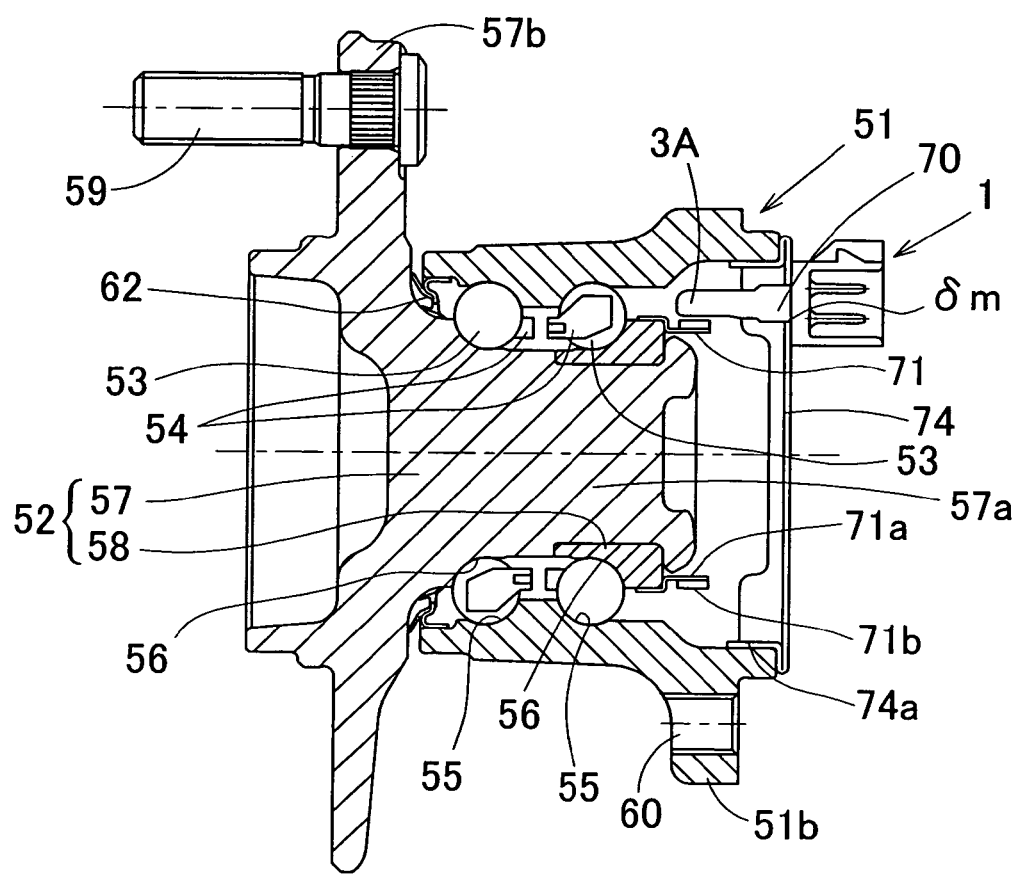
FIG. 19 is a longitudinal sectional view showing the wheel support bearing assembly according to a fifth embodiment of the present invention.
Figure 20:
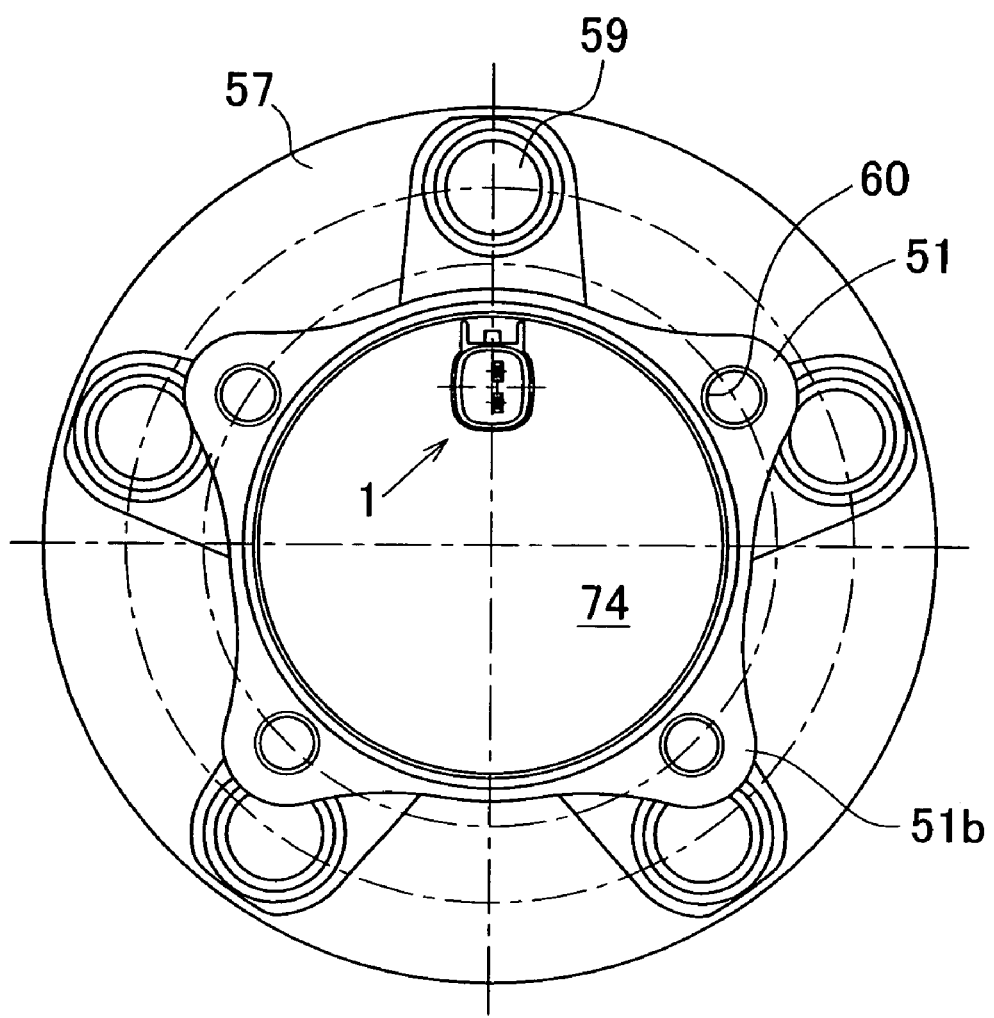
FIG. 20 is a side view showing the wheel support bearing assembly shown in FIG. 19 as viewed from the inboard side.

A fifth embodiment shown in FIGS. 19 and 20 is substantially similar to the first embodiment shown in and described with particular reference to FIG. 1, but different therefrom in that the wheel support bearing assembly according to the fifth embodiment is used to support a vehicle driven wheel and, for this purpose, the wheel hub 57 best shown in FIG. 19 has no longitudinal center bore defined therein and is, hence, a solid member. The magnetic encoder 71 is mounted on the outer periphery of the inner race 58. An annular inboard end of the outer member 51 extends axially outwardly beyond the inner member 52 with its annular end face closed by a covering 74. The covering 74 has an outer peripheral edge formed with an axially extending collar 74a and the covering 74 is capped onto the inboard annular open end of the outer member 51 with the collar 74a inserted into the inboard annular open end of the outer member 51. The sensor unit 70 is fitted to this covering 74 so as to confront radially the magnetic encoder 71. The sensor unit 70 is removably mounted on the covering 74 by means of bolts and nuts with at least a sensor portion (a portion where the sensor 3 is embedded) 3A of the sensor unit 70 inserted therein. In the condition in which the sensor portion 3A is inserted into the covering 74, an annular gap δm of the covering 74, which may be formed between it and the sensor unit 70 is tightly sealed by the effect of a resiliency of a molding material (elastic member) covering the sensor portion 3A.

According to the fifth embodiment shown in and described with particular reference to FIGS. 19 and 20, although the wheel support bearing assembly shown therein is used to support the vehicle driven wheel, the annular open end of the outer member 51 can be entirely covered by the covering 74 and, accordingly, a high sealing performance can be obtained with a simplified construction. Other structural features and effects brought about thereby are substantially similar to those according to the first embodiment shown in and described with particular reference to FIG. 1.

Figure 21:
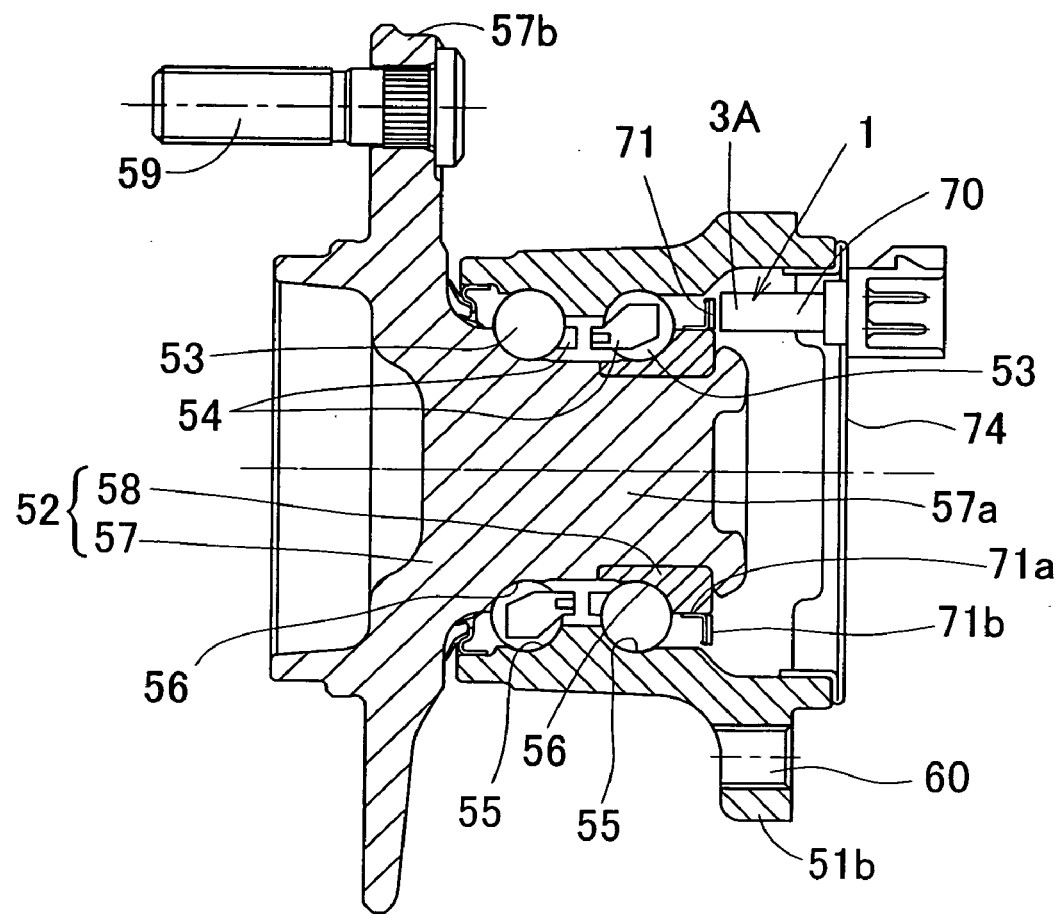
FIG. 21 is a longitudinal sectional view showing the wheel support bearing assembly according to a sixth embodiment of the present invention.
Figure 22:
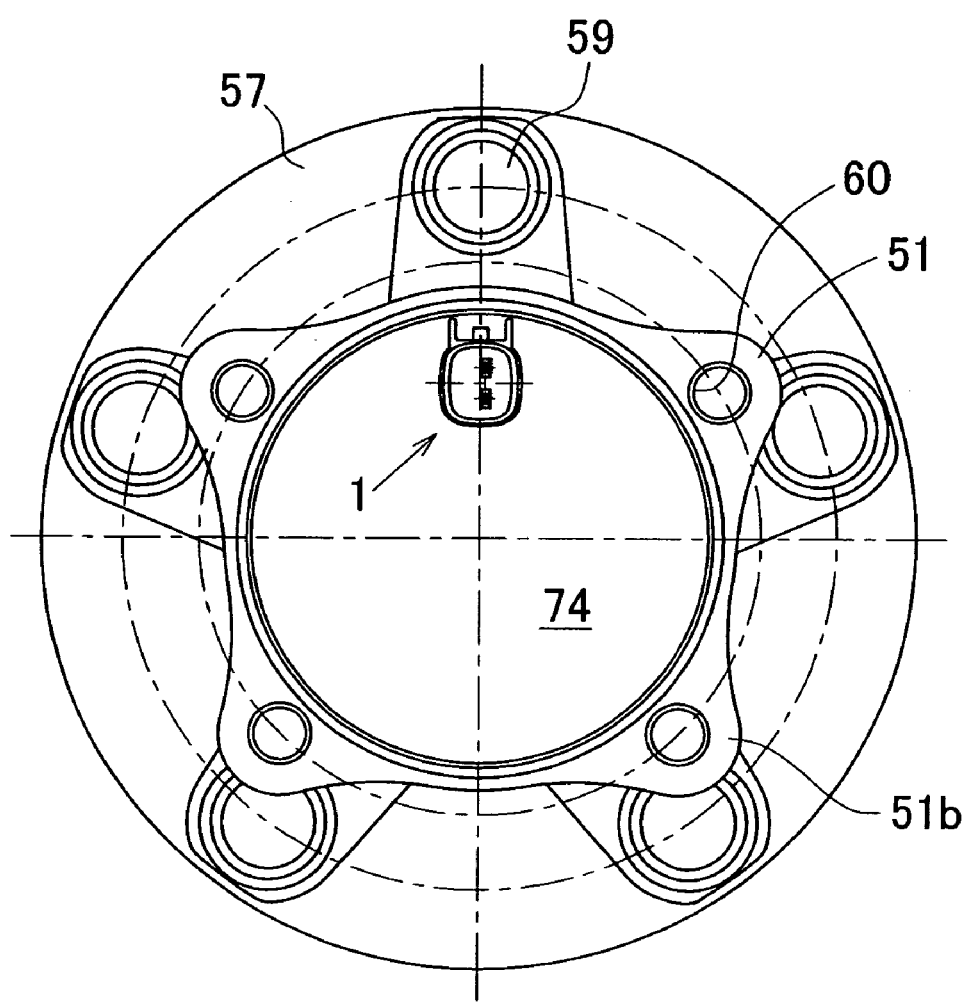
FIG. 22 is a side view showing the wheel support bearing assembly as shown in FIG. 21 viewed from the inboard side.

A sixth embodiment shown in FIGS. 21 and 22 is substantially similar to the fifth embodiment shown in and described with particular reference to FIGS. 19 and 20, except that the magnetic encoder 71 and the sensor unit 70, cooperatively forming the rotation detecting system 1, and both employed in the sixth embodiment, are so arranged as to confront with each other in the axial direction. Other structural features and effects brought about thereby are substantially similar to those according to the fifth embodiment shown in and described with particular reference to FIGS. 19 and 20.

Figure 23:
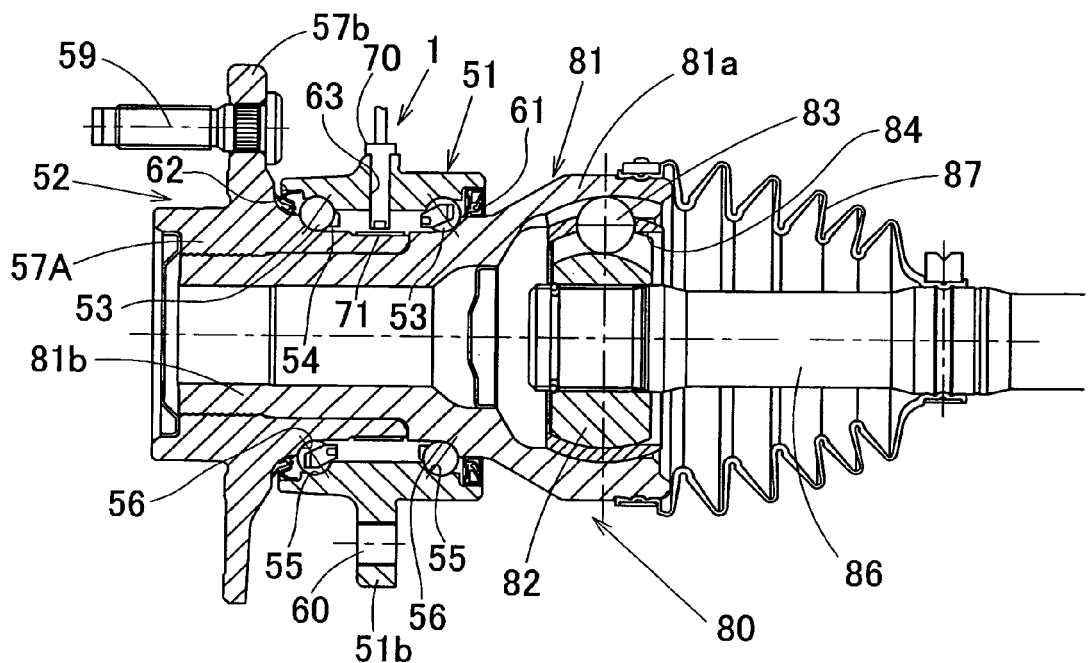
FIG. 23 is a longitudinal sectional view showing the wheel support bearing assembly according to a seventh embodiment of the present invention.

A seventh embodiment, which is shown in and will now be described with particular reference to FIG. 23, is an embodiment directed to a so-called fourth generation type and, therefore, the inner member 52 is made up of a wheel hub 57A and a constant velocity joint outer race 81.

A constant velocity joint 80 is of a structure in which a plurality of axially extending raceway grooves are formed on a spherical inner surface of the outer race 81 and a spherical outer surface of an inner race 82, respectively, and torque transmitting balls 83, retained by a ball retainer 84, are interposed between the raceway grooves that are opposed to each other. The constant velocity joint outer race 81 has a cup portion 81a and a hollow stem portion 81b protruding axially from an outer bottom surface of the cup portion 81a. The stem portion 81b is inserted into the wheel hub 57A of the wheel support bearing assembly and is relatively nonrotatably coupled with the wheel hub 57A by means of a diametric expansion crimping. Raceways 56 defined in the inner member 52 for the respective rows of rolling elements are formed in the wheel hub 57A and the constant velocity joint outer race 81, respectively. A boot 87 in the form of a bellows is mounted between the opening of the cup portion 81a of the constant velocity joint outer race 81 and a shaft 86.

The sensor unit 70 is, in a manner similar to that shown and described in connection with the first embodiment with particular reference to FIG. 1, fixedly inserted into the sensor mounting hole 63 defined in the outer member 51 as hereinbefore described. On the other hand, the magnetic encoder 71 is, in a manner similar to that shown and described in connection with the first embodiment with particular reference to FIG. 1, fixedly mounted on the outer periphery of the wheel hub 57A of the inner member 52 so as to confront the sensor unit 70 in the radial direction.

According to the seventh embodiment, functions and effects similar to those afforded by the rotation detecting system 1 according to the first embodiment shown in FIG. 1 can be obtained.

Figure 24:
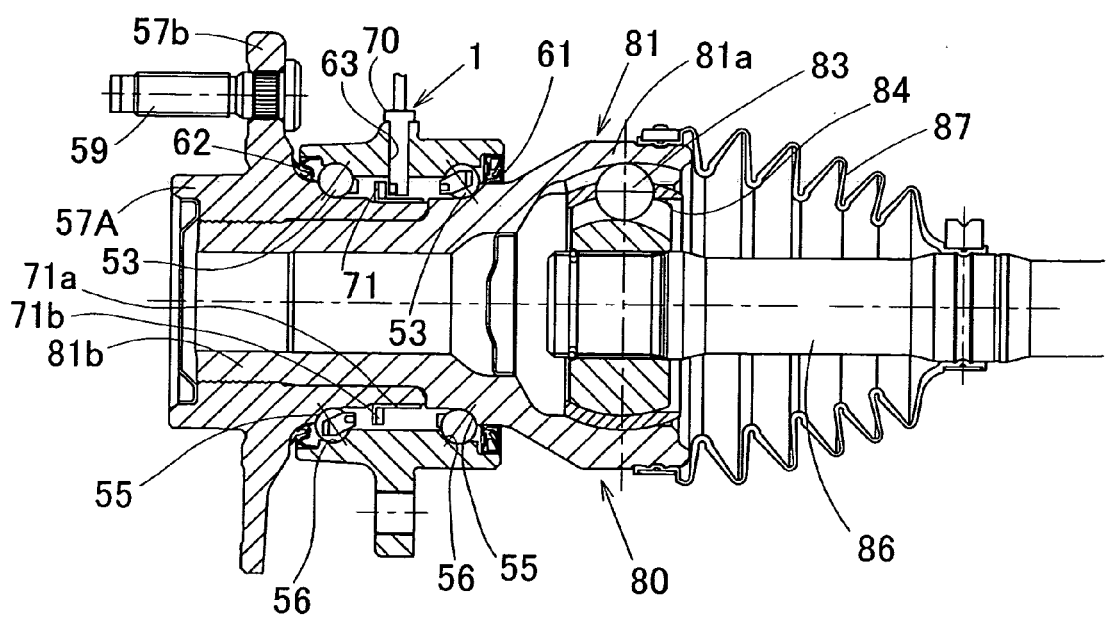
FIG. 24 is a longitudinal sectional view showing the wheel support bearing assembly according to an eighth embodiment of the present invention.

An eighth embodiment of the present invention shown in FIG. 24 is substantially similar to the seventh embodiment shown in and described with particular reference to FIG. 23, except that the magnetic encoder 71 employed in the eighth embodiment is so arranged as to confront the sensor unit 70 in the axial direction. Other structural features and effects brought about thereby are substantially similar to those brought about by the seventh embodiment shown in and described with reference to FIG. 23.

Figure 25:
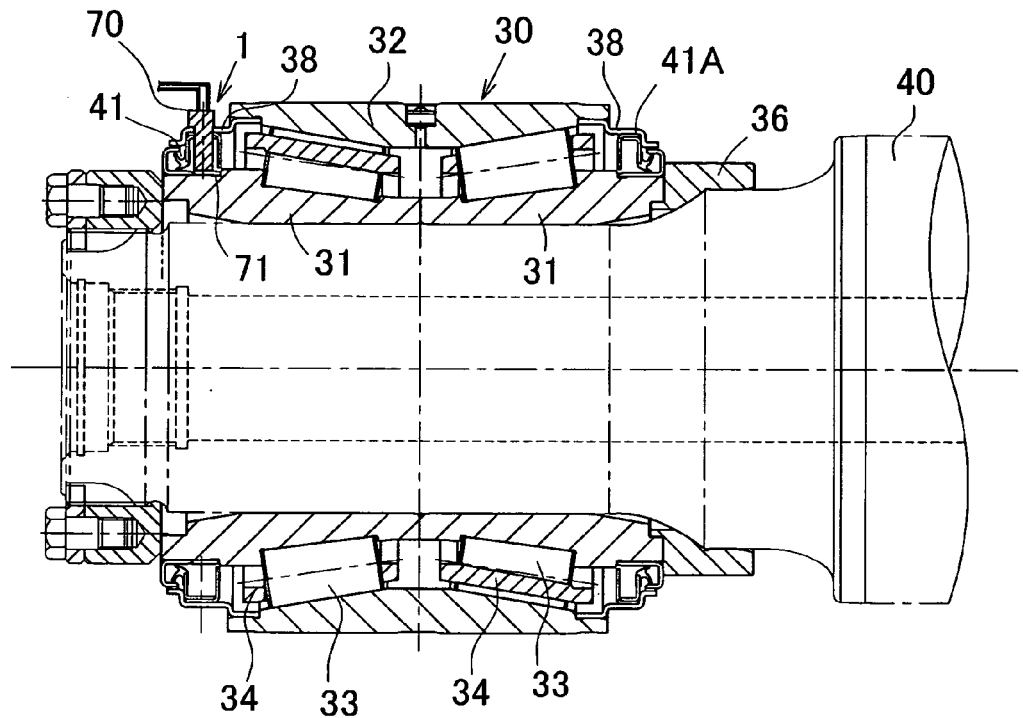
FIG. 25 is a longitudinal sectional view showing the wheel support bearing assembly according to a ninth embodiment of the present invention.
Figure 26:
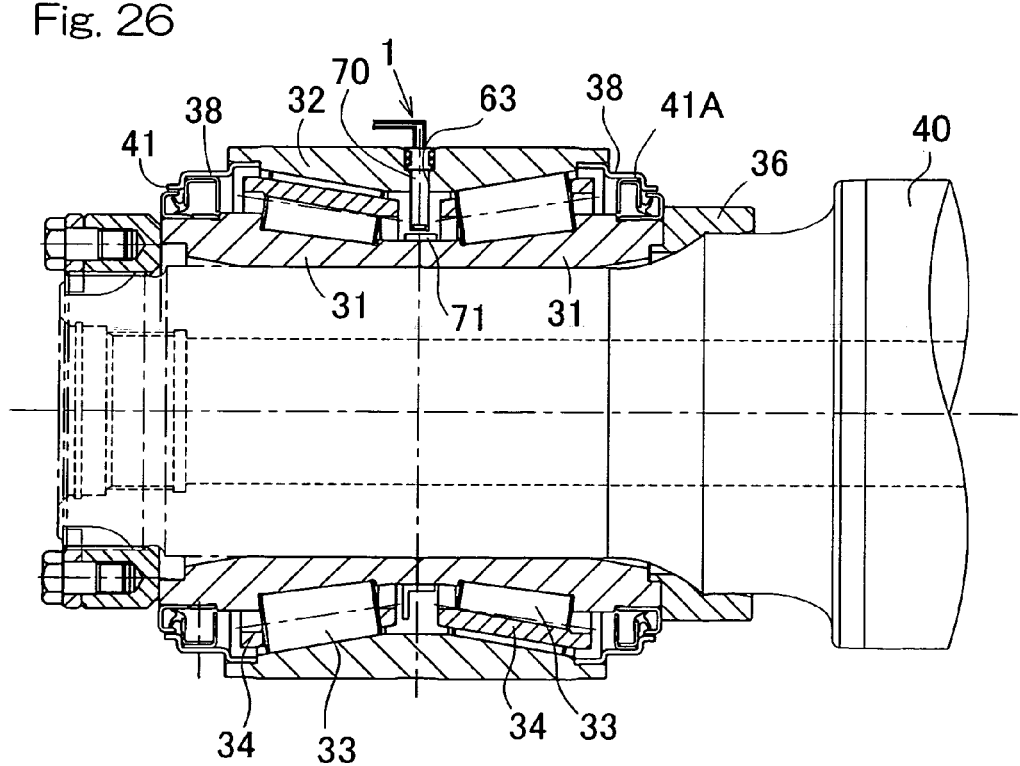
FIG. 26 is a longitudinal sectional view showing the wheel support bearing assembly according to a tenth embodiment of the present invention.

In ninth and tenth embodiments shown respectively in FIGS. 25 and 26, the rotation detecting system 1 according to any one of the foregoing embodiments is incorporated in a bearing assembly for a railway vehicle to form an example of the wheel support bearing assembly equipped with the rotation detecting system. The bearing assembly identified generally by 30 is in the form of a rolling bearing assembly, more specifically a double row tapered roller bearing assembly, which includes inner race members 31 and 31 of a split type provided for the respective rows of rollers 33 and 33, outer race member 32 of one piece construction, the rows of the rollers 33 and 33 and roller retainers 34 one for each row of the rollers 33. A rear lid 36 is fitted to a shaft 40 at a position closer to the longitudinal center of the vehicle body than the bearing assembly 30. A lubricant is confined within the bearing assembly 30 by means of bearing seals 41 and 41A arranged at opposite ends of the bearing assembly 30, respectively, thereby securing a dust control and a waterproof.

In a ninth embodiment of the present invention shown in FIG. 25, of outboard bearing seals 41, an annular seal casing 38 fitted to one end of the bearing assembly outer race member 32 has the sensor unit 70 accommodated therein. In such case, the magnetic encoder 71 is fixedly mounted on the outer periphery of an outboard inner ring 31 so as to confront the sensor unit 70 in the radial direction. It is to be noted that although not shown, the sensor unit 70 may be mounted on an inboard annular seal casing 38 on the bearing assembly outer race member 32.

Also, in a tenth embodiment of the present invention shown in FIG. 26, the sensor unit 70 is secured to the bearing assembly outer race member 32 while fixedly inserted into a sensor mounting hole 63 that is defined in the outer race member 32 at a location substantially intermediate between the rows of the rollers 33 and 33 so as to extend radially.

Even in the rotation detecting system equipped wheel support bearing assembly that is incorporated in the railway vehicle bearing assembly, since as hereinbefore described, the multiplied pulses Pb are generated by the multiplying section 4 and, as far as the speed is concerned, the speed is outputted at the interval of the pulse before it is multiplied, it is possible to output, with high precision, a speed of which pitch errors have been averaged. Also, since the detected speed is detected with the use of all of the multiplied pulses, the rate of detection of the speed becomes high. In other words, the number of sampling times for the detection of the speed can be increased. Accordingly, the response to control can be increased and even the slight change in speed can be detected with high precision. Since the number of rotational pulses, which is several to tens times the number of the conventional rotational pulses, can be obtained even though any existing encoder 71 is employed, even slight rotation can be detected. Also, since the rotation detecting unit can have a reduced diameter simultaneously with enhancement of the high resolution, it is possible to contribute to reduction in size and weight of the wheel support bearing assembly as a whole. Yet, effects similar to those afforded by the rotation detecting system equipped wheel support bearing assembly of any other angular contact ball bearing type can be equally obtained.

Figure 27:
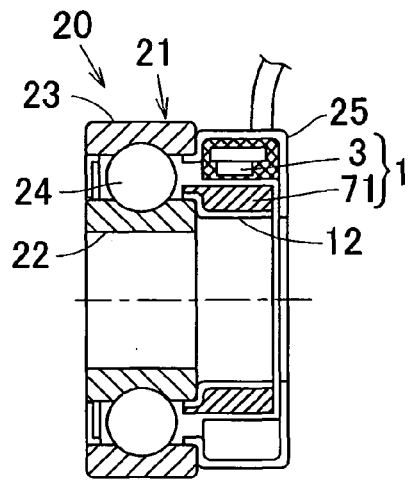
FIG. 27 is a longitudinal sectional view showing a deep groove ball bearing assembly according to an eleventh embodiment of the present invention.

A bearing according to an eleventh embodiment of the present invention is shown in FIG. 27. The bearing assembly shown therein is similarly equipped with the rotation detecting system 1 of the structure hereinbefore described. This rotation detecting system equipped bearing assembly 20 includes a bearing 21 made up of a rotating raceway ring 22 and a stationary raceway ring 23 rotatable relative to each other through a row of rolling elements 24, an encoder 71 of the radial type rotation detecting system 1 mounted on one end of the rotating raceway ring 22, and a sensor 3 of the rotation detecting system 1 mounted on one end of the stationary raceway ring 23 in face-to-face relation with the encoder 71 in the radial direction. The bearing 21 is in the form of a deep groove ball bearing assembly with its inner and outer rings serving respectively as the rotating and stationary raceway rings 22 and 23.

The encoder 71 is in the form of a magnetic encoder including a ring shaped backing metal 12 having its outer peripheral surface magnetized with magnetic pole pairs so as to be arranged in a circumferential direction thereof and is fixedly mounted on the rotating raceway ring 22 by means of the backing metal 12. The sensor 3 is molded within a ring shaped metallic casing 25 by means of a resin mold and is fixedly mounted on the stationary raceway ring 22 through the metallic casing 25. The multiplying section 4 and the speed detecting section 5 (both not shown) are arranged in the vicinity of the sensor 3.

With the rotation detecting system equipped bearing assembly 20 equipped with the rotation detecting system 1 as hereinabove described, not only can the rotation pulses of high resolution be obtained, but also the speed detection can be accomplished with high precision.

Figure 28:
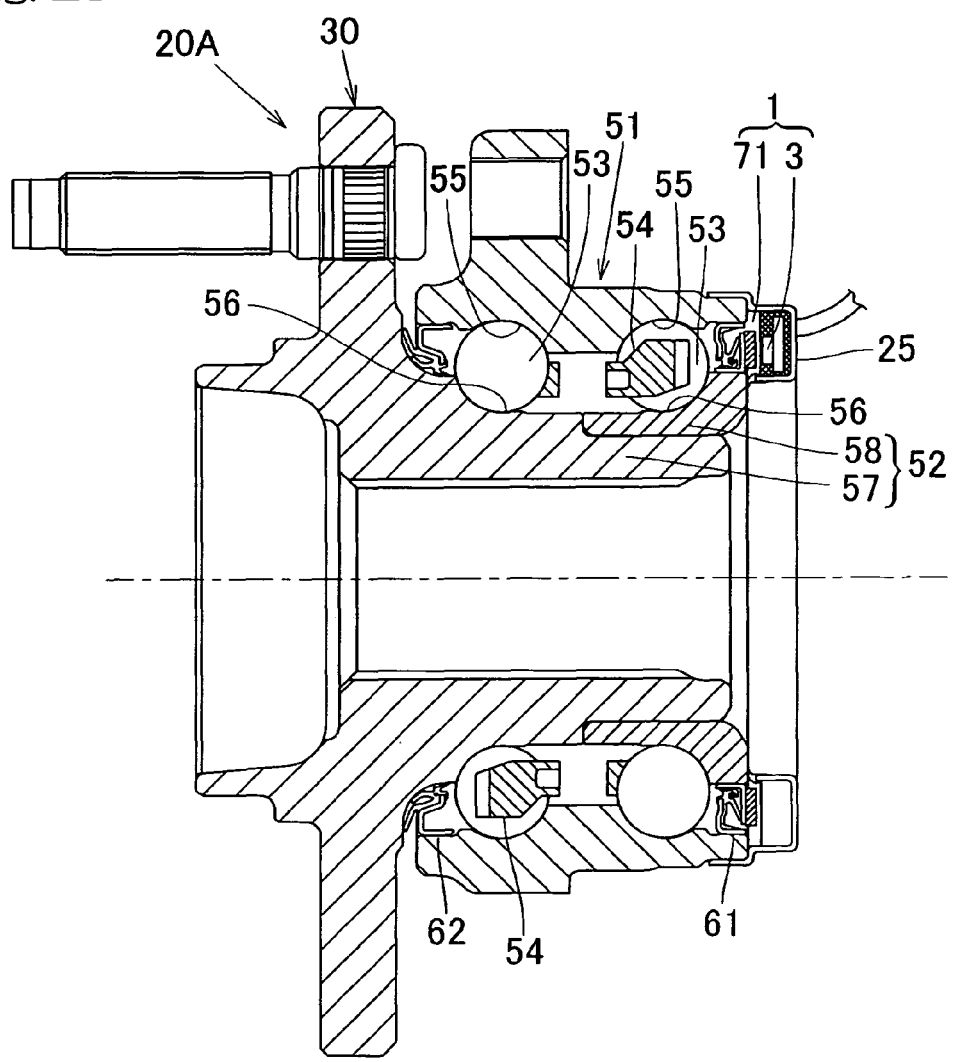
FIG. 28 is a longitudinal sectional view showing the wheel support bearing assembly according to a twelfth embodiment of the present invention.
Figure 29:
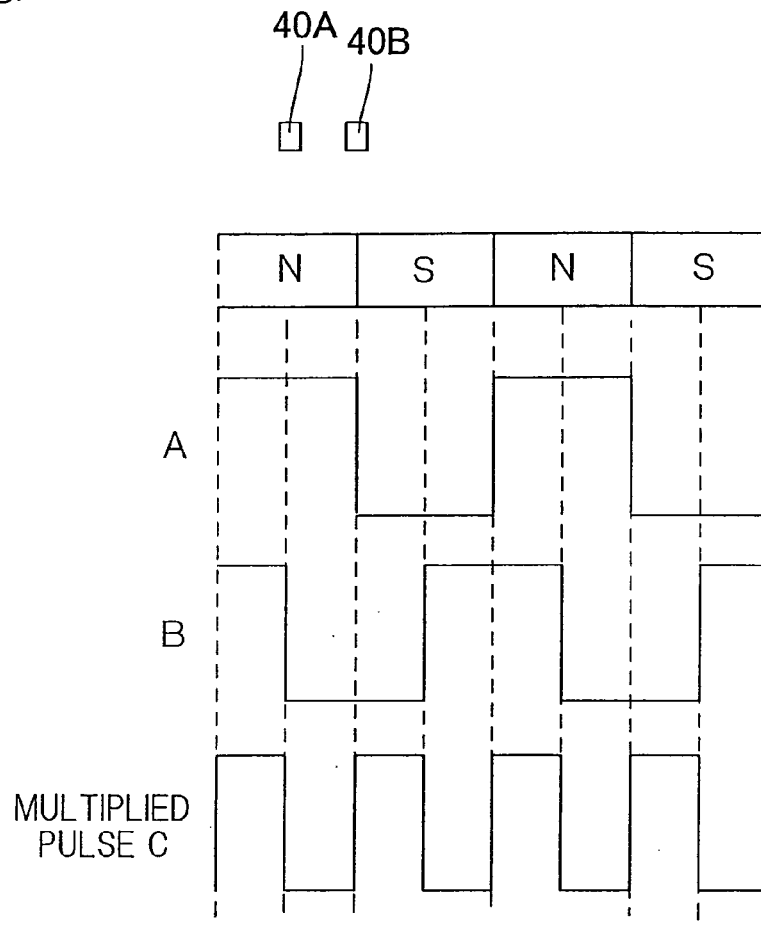
FIG. 29 is an explanatory diagram showing the related art system of generating multiplied signals from output signals of the sensor.
Figure 30:
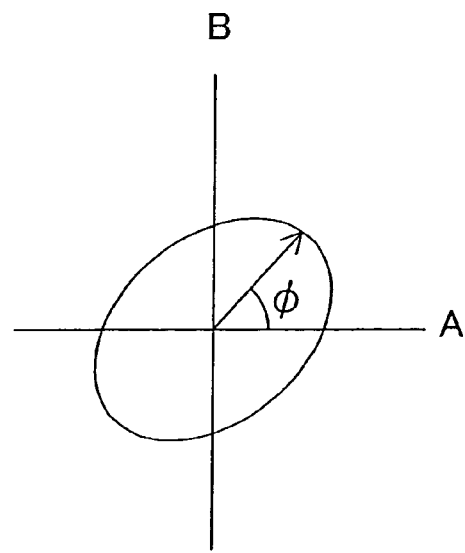
FIG. 30 is an explanatory diagram showing the related art system of generating the multiplied signals from analog output signals of the sensor.
Figure 31:
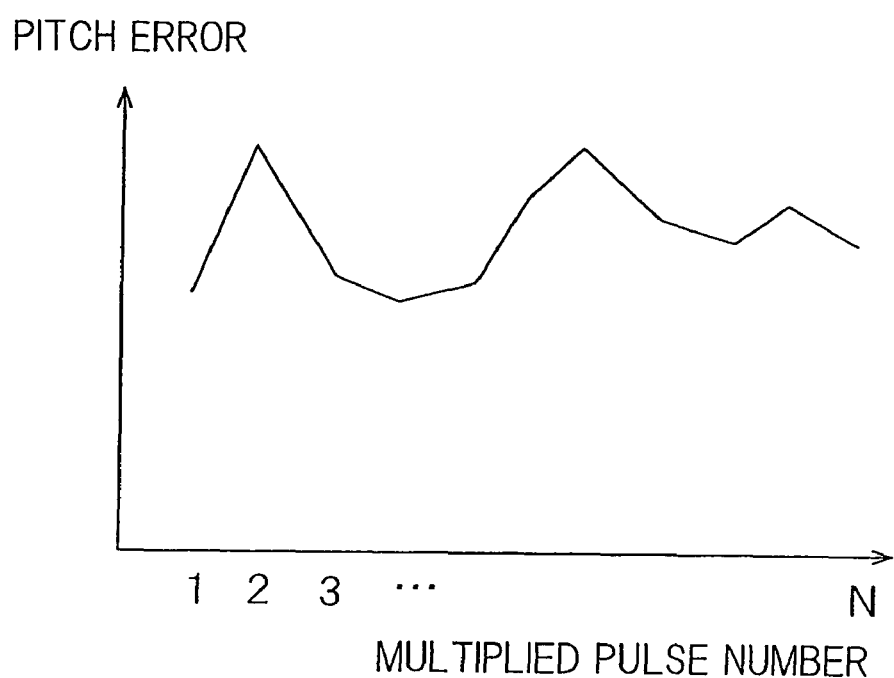
FIG. 31 is a chart showing the pitch error of the multiplied pulses according the related art.

Referring now to FIG. 28, there is shown a wheel support bearing assembly according to a twelfth embodiment of the present invention. The wheel support bearing assembly shown therein similarly has the rotation detecting system 1 mounted thereon. This rotation detecting system equipped bearing assembly 20A is an inner ring rotating type of a third generation type and is of a type, in which the axial type wheel support bearing assembly 30 for use in supporting a vehicle drive wheel is mounted.

The wheel support bearing assembly 30 includes an outer member 51 having an inner periphery formed with raceways 55, an inner member 52 having raceways 56 formed therein in face-to-face relation with those raceways 55 and double rows of rolling elements 53 interposed between the raceways 55 and 56 of the outer and inner members 51 and 52 and is used to rotatably support a vehicle wheel relative to a vehicle body structure. This wheel support bearing assembly 30 is rendered to be a double row, outwardly oriented angular contact ball bearing type and the rolling elements 53 are employed in the form of balls which are retained by respective retainers 54 one for each row of the rolling elements 53.

Opposite annular open ends of a bearing space delimited between the outer and inner members 51 and 52 are sealed by outboard and inboard sealing members 61 and 62, respectively. The inboard sealing member 61 has a slinger press-fitted onto an outer peripheral surface of the inner member 52 and serving as a magnetic encoder 71 of the rotation detecting system 1. A sensor 3 of the rotation detecting system 1 is arranged so as to confront a side face of the magnetic encoder 71, where the magnetic pole pairs are deployed in a circumferential direction thereof, in an axial direction. The sensor 3 is molded within a ring shaped metallic casing 25 by means of a resin mold and is fixed to the outer member 51 through the metallic casing 25. The multiplying section 4 and the speed detecting section 5 (both not shown) are arranged in the vicinity of the sensor 3.

It is to be noted that although the wheel support bearing assembly according to any one of the foregoing embodiment has been shown and described as a third or fourth generation type, the rotation detecting system equipped wheel support bearing assembly of the present invention can be equally applied to a wheel support bearing of a first or second generation type, in which the wheel hub and the bearing are provided separately, and also to a wheel support bearing assembly in which the outer member is employed on the rotating side and the inner member is on the stationary side. Also, the to-be-detected element that is to be detected by the rotation detecting system 1 may not be always limited to the magnetic encoder and may be a gear-shaped pulsar ring made of a metallic material.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

The invention claimed is:

1. A rotation detecting system which comprises:
an encoder provided rotatably and having a plurality of to-be-detected elements arranged equidistantly in a direction circumferentially thereof;
a sensor for detecting the to-be-detected elements of the encoder to generate pulses;
a multiplying section for multiplying the pulses, generated by the sensor, by a multiplication factor, which is represented by N, to form multiplied pulses; and
a speed detecting section for updatingly detecting a period average speed of the encoder during the interval in the past, in which the latest N pieces of the multiplied pulses have been generated,
wherein the speed detecting section comprises a pulse generating time storage having a storage area for storing the time of generation of each of the latest N pieces of the multiplied pulses, a timer operable to measure the times of generation of the multiplied pulses, each time the multiplied pulse is generated, and to update the storage contents of the pulse generating time storage to be represented by time of generation of the latest N pieces of the multiplied pulses, and a speed calculating circuit for calculating the difference between the time of generation of the latest multiplied pulse and the time of generation of the past multiplied pulses equal to the number of the multiplication factors stored in the pulse generating time storage and for calculating an average rotational speed, using this calculated difference.

2. The rotation detecting system as claimed in claim 1, wherein the encoder is a magnetic encoder having magnetic poles, which serves as the to-be-detected elements, arranged in the direction circumferentially thereof, and wherein the sensor is a magnetic sensor for detecting the magnetic poles of the magnetic encoder.

3. The rotation detecting system as claimed in claim 1, wherein the encoder comprises a ferrite magnet and has a magnetized magnetic pole width within the range of 1 to 3 mm.

4. The rotation detecting system as claimed in claim 1, further comprising a rotational pulse output section for outputting the multiplied pulses, generated by the multiplying section, as rotational pulses and a speed signal output section for outputting the speed, detected by the speed detecting section, as a speed signal.

5. The rotation detecting system as claimed in claim 1, wherein the sensor, the multiplying section and the speed detecting section are either integrated on a common sensor chip or integrated together using a common substrate.

6. The rotation detecting system as claimed in claim 1, wherein the sensor and the multiplying section are comprised of a plurality of arranged magnetic detecting elements and wherein based on an internal signal generated by calculating respective outputs from the magnetic detecting elements, an output of a predetermined multiplication factors is generated.

7. A rotation detecting system equipped bearing assembly having mounted thereon the rotation detecting system as described in claim 1.

* * * * *